(12) United States Patent
Moniz et al.

(10) Patent No.: US 10,250,455 B1
(45) Date of Patent: Apr. 2, 2019

(54) DEPLOYMENT AND MANAGEMENT OF TENANT SERVICES

(71) Applicant: Amazon Technologies, Inc., Reno, NV (US)

(72) Inventors: Samuel Leonard Moniz, Seattle, WA (US); Kevin Michael Beranek, Seattle, WA (US); Keian Christopher, Seattle, WA (US); Kyle Bradley Peterson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 14/298,603

(22) Filed: Jun. 6, 2014

(51) Int. Cl.
*H04L 12/24* (2006.01)
*H04L 29/08* (2006.01)
*H04W 28/02* (2009.01)
*H04L 12/851* (2013.01)

(52) U.S. Cl.
CPC .................... *H04L 41/50* (2013.01)

(58) Field of Classification Search
CPC ....... H04L 41/50; H04L 12/24; H04L 51/046; H04L 12/2424; H04L 41/24; H04L 12/2454
See application file for complete search history.

(56) References Cited

U.S. PATENT DOCUMENTS

| | | | |
|---|---|---|---|
| 7,383,326 B1 | 6/2008 | Himberger et al. | |
| 7,676,833 B2 | 3/2010 | Lester et al. | |
| 7,814,226 B2 | 10/2010 | Patrick | |
| 8,904,396 B2 * | 12/2014 | Chang | G06F 9/5055 718/102 |
| 9,143,390 B2 * | 9/2015 | Sylvest | H04L 12/24 |
| 9,195,666 B2 | 11/2015 | Horn et al. | |
| 2005/0027779 A1 | 2/2005 | Schinner | |
| 2007/0127377 A1 | 6/2007 | Brocke et al. | |
| 2007/0214042 A1 * | 9/2007 | Dominowska | G06Q 30/02 705/14.55 |
| 2008/0140759 A1 | 6/2008 | Conner et al. | |
| 2008/0140760 A1 | 6/2008 | Conner et al. | |

(Continued)

OTHER PUBLICATIONS

U.S. Appl. No. 14/133,529, filed Dec. 18, 2013, Moniz et al.

(Continued)

*Primary Examiner* — Azizul Choudhury
(74) *Attorney, Agent, or Firm* — Lee & Hayes, P.C.

(57) ABSTRACT

Host computers in a host pool are configured to execute a tenant management service. The tenant management service receives a tenant configuration from a fleet management service that defines tenant services that are to be executed on each host computer. When tenant services are deployed, the tenant configuration may be utilized to determine whether deployed tenants are to be executed or not. The fleet management service might also provide commands at a later time to execute deployed but not executing tenant services or to terminate executing tenant services. The determination as to whether to execute or terminate tenant services may be made based, at least in part, on status information provided by the tenant management service to the fleet management service. The fleet management service might also provide a runtime configuration to tenant services in order to configure aspects of the runtime operation of the tenant services.

23 Claims, 12 Drawing Sheets

(56) References Cited

U.S. PATENT DOCUMENTS

| | | |
|---|---|---|
| 2008/0140857 A1 | 6/2008 | Conner et al. |
| 2010/0004941 A1 | 1/2010 | Chang et al. |
| 2010/0250608 A1* | 9/2010 | Malviya ............ G06F 17/30306 707/792 |
| 2010/0313207 A1* | 12/2010 | Tanaka .................. G06F 9/5055 719/313 |
| 2010/0325195 A1 | 12/2010 | Kamp |
| 2011/0173599 A1* | 7/2011 | Ohama ..................... G06F 8/65 717/168 |
| 2012/0102531 A1 | 4/2012 | Schlack |
| 2013/0016628 A1* | 1/2013 | Bertani ................. H04L 41/046 370/255 |
| 2013/0041728 A1 | 2/2013 | Morrow et al. |
| 2013/0086270 A1* | 4/2013 | Nishikawa ............ G06F 9/5011 709/226 |
| 2013/0198341 A1 | 8/2013 | Kim |
| 2013/0223740 A1 | 8/2013 | Wang et al. |
| 2014/0181280 A1* | 6/2014 | Collins ............... G06F 17/3089 709/223 |
| 2014/0279268 A1 | 9/2014 | Muller et al. |
| 2014/0288981 A1 | 9/2014 | Rajkarnikar et al. |
| 2015/0236907 A1* | 8/2015 | Popli ................... H04L 41/0816 709/226 |
| 2015/0271276 A1* | 9/2015 | Edlund .................. H04L 41/06 709/224 |
| 2015/0341212 A1* | 11/2015 | Hsiao .................. H04L 41/0813 715/735 |
| 2015/0378848 A1* | 12/2015 | Kaneko ............... G06F 11/1471 714/19 |
| 2016/0205204 A1 | 7/2016 | Fersman et al. |

OTHER PUBLICATIONS

Cockcroft, A. "Migrating to Microservices" QCon London, 8$^{th}$ International Software Development Conference 2014, Mar. 6, 2014 [online][retrieved on Jun. 6, 2014] retrieved from: http://gconlondon.com/london-2014/presentation/Migrating%20to%20Microservices, 38 pps.

Office action for U.S. Appl. No. 14/298,593, dated Feb. 13, 2017, Moniz et al., "Routing to Tenant Services Utilizing a Service Directory", 8 pages.

Office action for U.S. Appl. No. 14/298,593, dated Nov. 4, 2016, Moniz et al., "Routing to Tenant Services Utilizing a Service Directory", 7 pages.

Office Action for U.S. Appl. No. 14/298,593, dated Jul. 14, 2017, Moniz et al., "Routing to Tenant Services Utilizing a Service Directory", 8 pages.

Office Action for U.S. Appl. No. 14/298,593, dated Jan. 29, 2018, Moniz et al., "Routing to Tenant Services Utilizing a Service Directory", 9 pages.

* cited by examiner

DEPLOYMENT AND MANAGEMENT OF TENANT SERVICES

BACKGROUND

In order to implement certain types of network services on a large scale, it may be necessary to execute instances of a network service on a large number of host computers (which may be referred to herein as "hosts"). In order to provide this functionality, hosts may be grouped as members of a host-class. A network service traditionally is deployed to all of the hosts within a hostclass. Additionally, different network services can be co-hosted on the same hosts within the same hostclass. There is, however, an upper limit to the number of services that can be co-hosted on the same host.

Partitioning of host computers in a fleet is one solution for scaling the implementation of a network service. Utilizing partitioning, a new fleet of host computers may be deployed, and new instances of a network service may be deployed to the new fleet. Partitioning, however, may make it difficult to deal with changes in the characteristics of co-hosted services. For example, scaling one service independently of other services that are co-hosted on hosts within the same partition may be difficult or inefficient because scaling typically involves adding host computers to a partition or deploying the same service to multiple partitions.

Other challenges might also exist when implementing certain types of network services in an efficient and scalable manner. For example, it may be difficult in some systems to configure service clients to access a desired network service. In one configuration, for instance, a configuration file that defines the network location of network services is deployed to each service client. The service client can utilize the configuration file to determine the network location of a service to be called. This mechanism, however, may be difficult to maintain as the configuration file must be updated and re-deployed to each service client when changes occur to the deployment of the network services. Other challenges might also exist when configuring service clients for use with network services.

It is with respect to these and other considerations that the disclosure made herein is presented.

DETAILED DESCRIPTION

Figure 1:
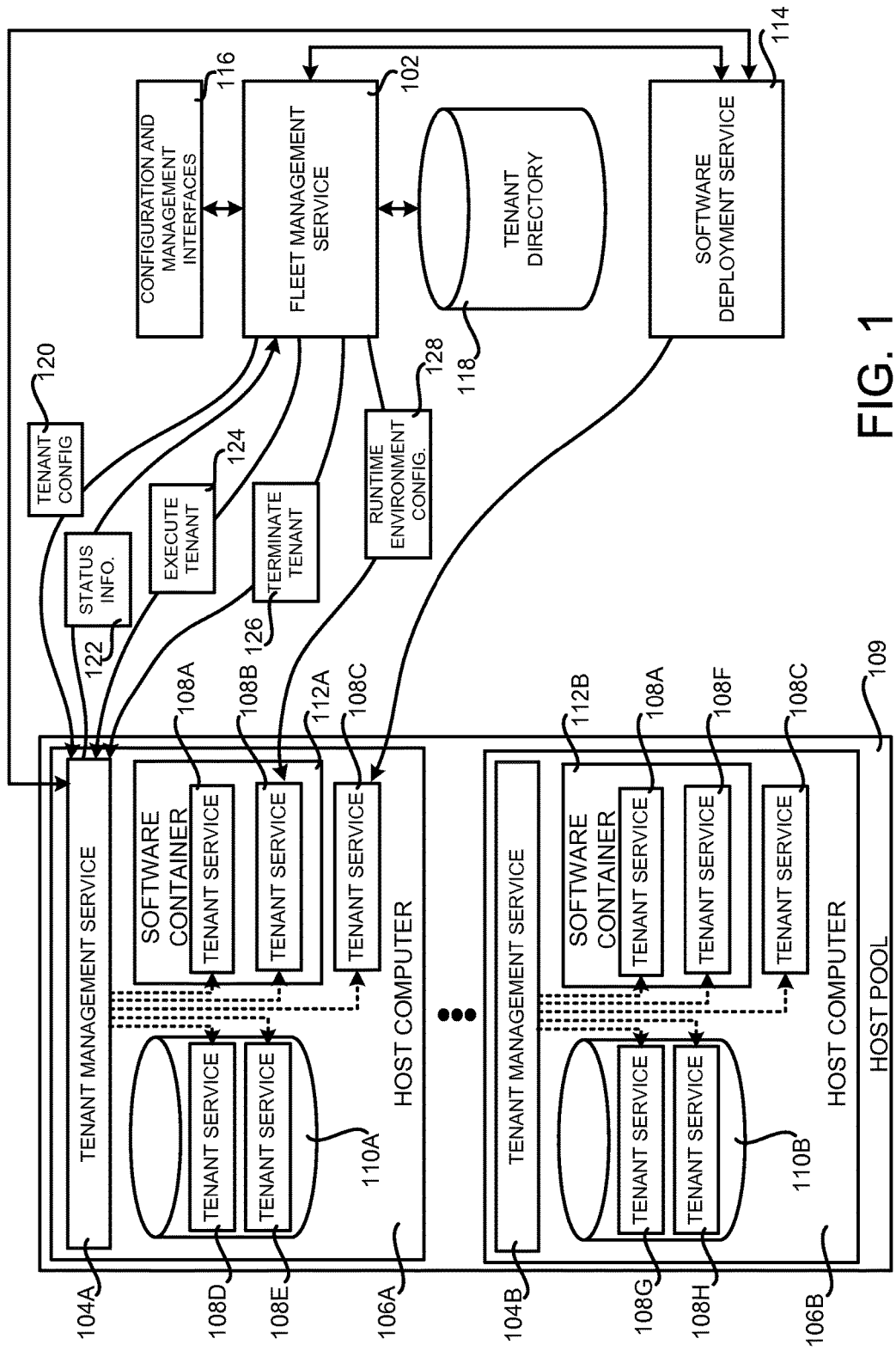
FIG. 1 is a system diagram showing aspects of the operation of several software components disclosed herein for deployment and management of tenant services.

The following detailed description is directed to technologies for deploying and managing tenant services, and for routing service requests to tenant services. Through an implementation of the technologies disclosed herein, tenant services can be deployed to host computers and executed in a flexible manner that does not require that all host computers in the same hostclass execute the same tenant services. Additionally, tenant services can be dynamically and continually re-distributed among available host computers for execution based upon various factors including, but not limited to, requirements specified by an owner or developer of a tenant, available computing resources from a host computer, computing resources utilized by the tenant services, demand for the tenant services, co-location and/or redundancy requirements, and/or other factors. Moreover, service clients can be provided with the network location of a service endpoint for processing a service request dynamically rather than using a static configuration file. The particular instance of a tenant service to be called for processing of a service request might be selected dynamically at request time based upon various factors.

According to one aspect disclosed herein, a pool of host computers is configured for executing tenant services (which might be referred to simply as "services" or "tenants"). In particular, each host computer is configured with a tenant management service that manages the execution of tenant services thereupon. The tenant services might be executed in-process with one another, such as within the same software container, or out of process from one another. Each host computer might also be configured with local storage for storing some or all of the tenant services executing thereupon.

The tenant management service executing on each host computer is configured to communicate with a fleet management service to configure aspects of its operation. For example, and without limitation, the tenant management service might obtain a tenant configuration from the fleet management service. The tenant configuration defines a set of tenants (i.e. zero or more tenants) that are to be executed on each host computer. The tenant configuration might also specify other types of information such as, but not limited to, whether a tenant is to be executed in-process with other tenants, such as within a software container, or out of process from other tenants (i.e. outside of a software container). The tenant configuration might also specify the container, or containers, in which certain tenants are to be executed and/or that some tenants are to be executed outside of a container.

A software deployment service might also be utilized to deploy tenants to the host computers. When the software deployment service deploys a tenant to a host computer, the tenant management service executing on the host computer may consult the tenant configuration received from the fleet management service to determine whether the deployed tenant is to be executed at the time of deployment. If the tenant is to be executed, the tenant management service permits the deployment to complete and allows the newly deployed tenant to be executed. If, however, the tenant is not to be executed on the host computer, the tenant management service still allows the deployment of the tenant to complete. The tenant, however, is not executed at the time of deployment. In this way, tenant services can be deployed to host computers but not executed. As will be described in greater detail below, the fleet management service might instruct the tenant management service to begin execution of a tenant on a particular host computer at a later time based upon various factors and/or considerations.

The fleet management service might also be configured to continually select tenants for execution on the host computers in the host pool. The selection of tenants for execution might be based upon various factors including, but not limited to, requirements specified by an owner or developer of a tenant, computing resources available from the host computers, computing resources utilized by executing and/or non-executing tenant services, demand for the tenant services, co-location and/or redundancy requirements, and/or other factors.

Depending upon the tenants selected for execution, the fleet management service might transmit a command to one or more of the hosts instructing the tenant management service to begin executing a previously deployed but not currently executing tenant. In this scenario, execution of the tenant may be started quickly because the tenant was previously deployed to the host by the software deployment service. If a tenant to be executed was not previously deployed to a host, the fleet management service might instruct the software deployment service to deploy the tenant to the appropriate host.

The fleet management service might similarly transmit a command to one or more of the hosts instructing the tenant management service to terminate the execution of a currently executing tenant. In this way, the fleet management service can control the tenants that are executing at any given time on the host computers. The selection of which tenants are executing may be made continuously and dynamically based upon the factors mentioned above and/or potentially other factors.

In order to assist the fleet management service in the selection of tenants for execution and the configuration of the tenants, the tenant management service might periodically provide status information to the fleet management service indicating the operational status of the host computer and/or the tenants executing thereupon. For example, status information might be provided that indicates the resources (e.g. CPU, memory, network bandwidth, etc.) available from the host computer and/or resources utilized by each of the tenants. The status information might also provide other types of information regarding the operational status of a host computer and/or the tenants executing thereupon.

The fleet management service might also be configured to provide a runtime environment configuration to the tenants executing on the host computers. The runtime environment configuration defines aspects of the runtime environment for the tenants, such as the amount of host resources that are to be utilized by a tenant. The runtime environment configuration might also configure aspects of the operation of one or more software containers executing on a host computer. The fleet management service might also provide an updated runtime environment configuration periodically. The runtime environment configuration might be updated based upon some or all of the factors described above including, but not limited to, the computing resources available from the host computer and/or the computing resources utilized by one or more of the tenants executing thereupon.

Utilizing the mechanisms described briefly above, and in greater detail below, the fleet management service can define the tenants that execute on each host computer along with the manner in which each tenant is executed. Moreover, utilizing the various technologies described herein, the fleet management service can dynamically and continually select the tenants for execution on the host computers in a host pool, define the manner in which the tenants are executed (e.g. in-process or out of process), the resources that each tenant may utilize, and/or other factors.

Other technologies disclosed herein provide functionality for routing network service requests to dynamically selected instances of tenant services. In particular, according to one configuration, a routing service is provided that exposes functionality through which a service client can obtain the network location of an instance of a tenant service for processing a service request generated by the service client. For example, a service client might provide a request to the routing service for the network location (e.g. IP address or URL) of an instance of a tenant service for handling a service request. In some configurations, the request includes metadata that describes attributes of the service client upon which the selection of an appropriate instance of a tenant service might be made. For example, and without limitation, the metadata might include an identity of the service client making the request, a location of the service client, an identifier for the tenant service to be called, and/or one or more quality of service ("QOS") requirements or preferences associated with the service client.

The routing service might also utilize other types of information when selecting an instance of a tenant service for processing a service request. For example, and without limitation, the routing service might utilize attributes of the instances of the tenant service in the selection process, such as the status information provided by the tenant management service described above. The routing service might also utilize other attributes associated with the available instances of the tenant service such as, but not limited to, the location of the instances of the tenant service, resource utilization of host computers executing the instances of the tenant service, a volume of service requests being processed by the instances of the tenant service, or a type associated with the instances of the tenant service. Using some of this information, for example, the routing service might select an instance of the tenant service based upon locality (e.g. the service client is in the same data center as the instance of the tenant service), regionality (e.g. the service client is in the same geographic region as the instance of the tenant service), or other considerations.

Once the routing service has selected an instance of a tenant service for processing a service request, the routing service may provide the network location of the instance of the tenant service to the service client. For example, and without limitation, the routing service might provide an IP address or a URL for the selected instance of the tenant service. The service client might then utilize the provided network location to make a service request to the selected instance of the tenant service. The service client might also store the provided network location in a local storage cache for future use.

By utilizing some or all of the information described above in order to select an instance of a tenant service to process a service request, various types of functionality might be achieved. For example, and without limitation, segmentation of service requests generated by a multitude of service clients might be enabled. Segmentation refers to a process of providing some service requests to one group of instances of a tenant service while providing other service requests to another group of instances of the tenant service. For example, and without limitation, "A/B" testing of different versions of a tenant service might be enabled by selecting instances of one version of a tenant service to process some service requests and selecting instances of another version of a tenant service to process other service requests. In this way, service requests can be segmented based upon the currently executing version of a tenant service. The routing service might also select an instance of a tenant service to process a service request in order to implement load balancing between available instances of a tenant service, to gradually deploy new versions of a tenant service to a fleet and/or to provide other functionality.

In another configuration, the routing service acts as a proxy for service requests generated by service clients. In particular, and without limitation, a service client may provide a service request to the routing service. The service request may include some or all of the metadata described above including, but not limited to, an identifier for the service that is to be called. In response to receiving such a service request, the routing service may select an executing instance of a tenant service to process the service request generated by the service client. As discussed above, attributes of the service client, attributes of the available instances of the tenant service, and/or other factors may be utilized to select an instance of a tenant service to process the service request.

Once an instance of the tenant service has been selected for processing the service request, the routing service provides the service request to the selected instance of the tenant service for processing. The tenant service may then process the service request and provide a service response to the routing service. In turn, the routing service may provide the service response to the service client in reply to the original service request.

In some configurations, the routing service might also be configured to provide service requests received from service clients to one or more other services. For example, and without limitation, the routing service might be configured to provide service requests to a logging service for logging service requests received by the routing service. The routing service might also provide service requests to other types of services in other configurations to provide other types of functionality. Additional details regarding the implementation and operation of the technologies disclosed herein for deploying and managing tenant services and for routing service requests to tenant services are provided below with regard to FIGS. 1-12.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The various configurations described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific configurations, aspects, or examples. The drawings herein are not drawn to scale. Like numerals represent like elements throughout the several figures.

FIG. 1 is a system diagram showing aspects of the operation of several software components disclosed herein for deployment and management of tenant services. In particular, and as illustrated in the example configuration shown in FIG. 1, host computers 106 in a host pool 109 (or simply "pool") are configured for executing tenant services 108 (which might be referred to simply as "tenants"). The host computers 106 might be suitably equipped server computers or other types of computing devices capable of executing the software components described herein, including the tenant services 108. Although the tenant services 108 are referred to herein as "services", such as network services, it should be appreciated that the technologies described herein might be utilized to deploy and execute computer programs other than services in a similar manner. Accordingly, the term "tenant services" is not limited to network services.

In the example configuration shown in FIG. 1, the host computer 106A has been configured to execute the tenant services 108A and 108B in a software container 112A and to execute the tenant service 108C outside the software container 112A. The tenant services 108D and 108E have been deployed to the host computer 106A and are stored on a mass storage device 110A but are not currently executing in the illustrated example. The host computer 106B has also been configured in the shown example to execute the tenant services 108A and 108F in a software container 112B and to execute the tenant service 108C outside the software container 112B. The tenant services 108G and 108H have been deployed to the host computer 106B and are stored on a mass storage device 110B but are not currently executing in this example.

It should be appreciated that although only two host computers 106A and 106B are shown in the host pool 109 in the example shown in FIG. 1, many more such host computers 106 might be configured and utilized in the manner disclosed herein. Additionally, although the operations disclosed herein are primarily illustrated with respect to a single host computer 106A, the described operations might be utilized with multiple or even all of the host computers 106 in the pool 109 in order to achieve a desired distribution of tenants 108 among the host computers 106. Virtual machine instances might also be utilized to provide an execution environment for the tenant management service 104, the software container 112 and the tenant services 108. It should also be appreciated that many more, or fewer, tenant services 108 might be executed on a host 106 than shown in FIG. 1.

In order to provide the functionality disclosed herein, the host computers 106 in the pool 109 are configured to execute a tenant management service 104 that manages the execution of tenant services 108 thereupon. In FIG. 1, for example, an instance of the tenant management service 104A has been deployed to the host computer 106A. Similarly, an instance of the tenant management service 104B has been deployed to the host computer 106B. The tenant management service 104 might be executed in a virtual machine or directly on the hardware of a host computer 106. Other mechanisms might also be utilized to execute the tenant management service 104.

The tenant management service 104 executing on each host computer 106 is configured to communicate with a fleet management service 102 to configure aspects of its operation. For example, and without limitation, the tenant management service 104 might obtain a tenant configuration 120 from the fleet management service 102. In the example shown in FIG. 1, the tenant management service 104A has obtained the tenant configuration 120 from the fleet management service 102. Other instances of the tenant management service 104 executing on host computers 106 in the pool 109 might also obtain their own unique tenant configuration 120 from the fleet management service 102.

The tenant configuration 120 defines a set of tenants 108 (i.e. zero or more tenants 108 in one configuration; one or more tenants 108 in another configuration) that are to be executed on each host computer 106. In FIG. 1, for example, the tenant configuration 120 for the host computer 106A might indicate that the host computer 106A is to execute the tenant services 108A, 108B and 108C. The tenant configuration 120 might also specify other types of information such as, but not limited to, whether each tenant 108 is to be executed in-process with other tenants 108, such as within a software container 112 in some configurations, or out of process from other tenants 108 (i.e. outside of a software container in some configurations). In FIG. 1, for example, the tenant configuration 120 might also specify that the tenant services 108A and 108B are to be executed in a software container 112 and that the tenant service 108C is to be executed outside of a software container 112. The tenant configuration 120 might also specify other aspects of the manner in which tenants 108 are to be executed on a host computer 106.

It should be appreciated that while each host computer 106 shown in FIG. 1 is illustrated as executing only a single software container 112, each of the host computers 106 might execute multiple software containers 112. Utilizing the mechanisms disclosed herein, the fleet management service 102 might configure each host computer 106 to execute zero or more software containers 112, might specify the type of each container 112 to be executed, and might provide a configuration for each container 112. As discussed herein, the configuration for each container might also be updated continually during runtime.

A software container 112 may provide functionality for multi-tenant 108 execution, loading dependencies, interconnecting tenant services 108 at run time, managing lifecycles including integrated deployment and eviction, and other types of functionality. Software containers 112 are available for use in many development and execution environments. For example, software containers are commonly available that utilize the JAVA programming language from ORACLE CORPORATION. Examples of software containers include, but are not limited to WEBSPHERE from IBM CORPORATION, SPRING FRAMEWORK from VMWARE CORPORATION, GUICE from GOOGLE CORPORATION, the PICOCONTAINER and PLEXUS projects from CODEHAUS, the FELIX, TOMCAT, TOMEE and GERONIMO projects from the APACHE SOFTWARE FOUNDATION, EQUINOX, GEMINI, JETTY and ECLIPSE from the ECLIPSE FOUNDATION, JBOSS from REDHAT CORPORATION, and GLASSFISH, WEBLOGIC, and FUSION from ORACLE CORPORATION. Although the configurations disclosed herein are primarily presented in the context of a software container 112, the configurations disclosed herein might also be utilized with other types of containers and with other types of execution environments.

In one configuration, the tenant configuration 120 is a file that maps host computer names to tenant service names. The tenant configuration 120 may be deployed to each host computer 106 in the pool 109 and consumed by the tenant management service 104 in the manner described herein. In another configuration, each instance of the tenant management service 104 might communicate with the fleet management service 102 to identify the tenants 108 that are to be executed on its host computer 106.

In another configuration, the tenant configuration 120 does not explicitly specify the tenants that are to be executed on each host computer 106. Rather, the tenant configuration 120 specifies a number of host computers 106 to which each tenant service 108 is to be deployed. The fleet management service 102 can utilize this information to distribute the tenant service 108 across an appropriate number of host computers 106 in the pool 109 in the manner described herein. In yet another configuration, a relative weight might be specified for each tenant service 108. For example, the tenant configuration 120 might specify that a first tenant 108 requires two times the resources of a second tenant 108. In this case the fleet management service 102 utilizes this information to cause the host computers 106 to execute an appropriate number of tenants 108 in order to satisfy the relative resource requirement. The fleet management service 102 might also use utilization metrics from the tenant management service 104 to dynamically assign weights, and transactions per second ("TPS") metrics to dynamically choose to increase the number of host computers 106 executing instances of a given tenant service 108.

A software deployment service 114 might also be utilized to deploy tenants 108 to the host computers 106. For example, and without limitation, the software deployment service 114 might be configured to deploy tenants 108 to the host computers 106 and execute one or more scripts to install files, configure the installation, and to begin execution of a deployed tenant 108. The software deployment service 114 might also perform other types of functionality in order to deploy a tenant service 108 to a host computer 106. In the example shown in FIG. 1, the software deployment service 114 is illustrated as deploying the tenant service 108C to the host computer 106A. It should be appreciated, however, that the software deployment service 114 might be utilized to deploy other tenants 108 to other host computers 106. A tenant service 108 might be deployed to local storage of a host computer 108, such as a mass storage device 110, or might be deployed to another location such as a network share for later use by a host computer 106.

When the software deployment service 114 deploys a tenant 108 to a host computer 106, the tenant management service 104 executing on the host computer 106 may consult the tenant configuration 120 received from the fleet management service 102 to determine whether the deployed tenant 108 is to be executed at the time of deployment. In FIG. 1, for example, the tenant management service 104A may determine whether the tenant configuration 120 indicates that the tenant service 108C is to be executed following deployment by the software deployment service 114.

If a newly deployed tenant 108 is to be executed, the tenant management service 104 permits the deployment to complete and allows the newly deployed tenant 108 to be executed. In FIG. 1, for example, the tenant management service 104 has permitted execution of the tenant service 108C to begin following deployment. If, however, a tenant 108 is not to be executed on a host computer 106 at deployment time, the tenant management service 104 still allows the deployment of the tenant 108 to complete. The tenant 108, however, is not executed at the time of deployment. In this way, tenant services 108 can be deployed to host computers but not executed. In FIG. 1, for example, the tenant services 108D and 108E have been deployed to the host computer 106A but are not executing. Similarly, the tenant services 108G and 108H have been deployed to the host computer 106B but are not executing. As will be described in greater detail below, the fleet management service 102 might instruct the tenant management service 104 to begin executing a deployed but not executing tenant 108 at a later time based upon various factors and/or considerations.

It should be appreciated that the term deployment, as utilized herein, encompasses not only an initial deployment (e.g. installation) of a tenant 108 to a host computer 106, but also an update to a tenant 108 or another type of modification to the program code of the tenant 108. This term also encompasses an update or another type of modification to a software container executing on a host computer 106 and/or an instances of the tenant management service.

The fleet management service 102 might also be configured to continually select the tenants 108 that are to be executed on each of the host computers 106 in the host pool 109. The selection of tenants 108 for execution might be based upon various factors including, but not limited to, requirements or preferences specified by an owner or developer of a tenant 108 (e.g. a capacity requirement), computing resources available from the host computers 108, computing resources utilized by executing and/or non-executing tenant services 108, demand for the tenant services 108 (e.g. the volume of incoming network requests), co-location (e.g. two tenants 108 should execute on the same host computer 106, in the same rack of host computers, in the same data center, in the same region, etc.) and/or redundancy requirements (e.g. two tenants 108 should not execute on the same host computer 106, in the same rack of host computers, in the same data center, in the same region, etc.), current or predicted demand, soft or hard resource utilization caps, call graphs, and/or other factors.

Depending upon the tenants 108 selected for execution, the fleet management service 102 might transmit a command to one or more of the host computers 106 instructing the tenant management service 104 to begin executing a previously deployed but not currently executing tenant 108. For example, the fleet management service 102 might transmit an execute tenant command 124 to the host computer 106A instructing the tenant management service 104A to begin execution of the tenant service 108D or the tenant service 108E. In this scenario, execution of the tenant 108D may be started quickly because the tenant 108D was previously deployed to the host computer 106 even though it is not executing. If a tenant 108 to be executed was not previously deployed to a host computer 106, the fleet management service 102 might instruct the software deployment service 114 to deploy the tenant 108 to the appropriate host computer 106.

The fleet management service 102 might similarly transmit a command to one or more of the host computers instructing the tenant management service 104 to terminate the execution of a currently executing tenant 108. In FIG. 1, for example, the fleet management service 102 might transmit a terminate tenant command 126 to the tenant management service 104A instructing the tenant management service 104A to terminate the execution of the tenant service 108A, the tenant service 108B, or the tenant service 108C. It should be appreciated that although an execute tenant command 124 and a terminate tenant command 126 are illustrated in FIG. 1, the fleet management service 102 might be configured to provide other types of commands to the tenant management service 104 in other implementations. Through the use of these commands, the fleet management service 102 can control the tenants 108 that are executing at any given time on the host computers 106 and configure other aspects of the operation of the tenant management service 104 and/or instances of a tenant service 108. The selection of which tenants 108 are executing may be made continuously and dynamically based upon the factors mentioned above and/or potentially others.

In order to assist the fleet management service 102 in the selection of tenants 108 for execution and in the configuration of the tenants 108, the tenant management service 104 might periodically provide status information 122 to the fleet management service 102 indicating the operational status of the host computer 106 and/or the tenants 108 executing thereupon. For example, status information 122 might be provided that indicates the computing resources (e.g. CPU, memory, network bandwidth, etc.) available from a host computer 106 and/or resources utilized by each of the tenants 108 executing on the host computer. The status information 122 might also provide other types of information regarding the operational status of a host computer 106 and/or the tenants 108 executing thereupon. As discussed above, the fleet management service 102 might utilize this information in order to select tenants 108 for execution on the host computers 106 and/or to modify a previously made distribution of tenants 108 among the host computers 106.

In some configurations, the fleet management service 102 is also configured to provide a runtime environment configuration 128 to the tenants 108 executing on the host computers 106. The runtime environment configuration 128 defines aspects of a runtime environment for the tenants 108, such as the amount of host resources that are to be utilized by each tenant 108. In one specific configuration, for example, the runtime environment configuration specifies a JAVA virtual machine ("JVM") configuration such as heap memory allocation and port bindings. The runtime environment configuration 128 might specify other types of runtime configuration settings in other configurations. For example, and without limitation, the runtime environment configuration might also configure aspects of the operation of a software container and/or other components executing on a host computer 106.

The fleet management service 102 might also provide an updated runtime environment configuration 128 to each tenant 108 periodically. The runtime environment configuration 128 might be updated based upon some or all of the factors described above including, but not limited to, the computing resources available from a host computer 106 and/or the computing resources utilized by one or more of the tenants 108 executing thereupon. The runtime environment configuration 128 might also be updated based upon current or predicted demand for a host 106 and/or a tenant 108.

By periodically updating the runtime environment configuration 128 utilized by tenants 108 on each of the host computers 106, the fleet management service 102 can ensure that the tenant services 108 executing on each host computer 106 have sufficient computing resources. For example, the fleet management service 102 might monitor resource utilization and request rate and scale a tenant service 108 on a host computer 160 by increasing resource allocation to the tenant service 108 in an updated runtime environment configuration 128. The fleet management service 102 might also scale a tenant service 108 by starting execution of the tenant service 108 on other host computers 106 or by terminating the execution of other tenant services 108 on a host 106 to provide additional resources.

As shown in FIG. 1, the fleet management service 102 might also provide one or more configuration and management interfaces 116. The configuration and management interfaces 116 may be graphical user interfaces ("UIs"), application programming interfaces ("APIs"), or other types of interfaces through which users of the fleet management service 102 might configure aspects of its operation. For example, and without limitation, the configuration and management interfaces 116 might be utilized to specify requirements for deploying a certain tenant service 108, such as a number of host computers 106 to which the tenant service 108 is to be deployed. The configuration and management interfaces 116 might be utilized to define certain types of events the occurrence of which will result in the scaling up or down of a particular tenant service 108. Other types of configuration information might also be supplied in this manner. The configuration and management interfaces 116 might also allow a user to view management data, such as data identifying the particular host computers 106 to which a certain tenant service 108 has been deployed.

As illustrated in FIG. 1, the fleet management service 102 might utilize a tenant directory 118 (which might also be referred to herein as a "service directory") in some configurations to store data identifying the current distribution of tenant services 108 to host computers 106 in the pool 109. For example, and without limitation, the tenant directory 118 may store data providing a mapping between instances of each tenant service 108 and the host computers 106 upon which they are executing. This data may be periodically updated based upon the optimization performed by the fleet management service 102 described above.

Other types of data might also be stored in the tenant directory 118 regarding the tenant services 108. For example, and without limitation, data might be stored in the tenant directory 118 identifying a location of each tenant service 108, a version of each tenant service 108, and/or other information. This tenant directory 118 might also store, for instance, data identifying the particular server computer a tenant service 108 is executing upon, a rack containing the server computer, a room containing the rack, a data center containing the room, a geographic region containing the data center and, potentially, other types of information identifying the location of a particular tenant service 108.

The tenant directory 118 might also store other types of information about each tenant, such as the quality of service ("QOS") provided by each tenant 108, the current load on each tenant 108 and/or the host computer 106 upon which each tenant 108 is executing, the network latency to each tenant 108, a type of each tenant service 108 such as whether each tenant service 108 is a "production" service or a "development" service, and/or other types of information. Some of this information may be received from a tenant management service 104 as status information 122 in the manner described below.

Although a single tenant directory 118 is illustrated in FIG. 1, it should be appreciated that multiple, redundant tenant directories might also be utilized in certain configurations. The tenant directory 118 might be implemented utilizing a highly available and scalable data store or another suitable technology.

The tenant management service 104 might also provide other functionality in some configurations. For example, and without limitation, the tenant management service 104 might be configured to begin the execution of certain tenant services 108 and/or other programs executing on a host 106 in a pre-defined order. The fleet management service 102 specifies the order of execution in some configurations. The tenant management service 104 might also be configured to determine whether all of the tenant services 108 that are supposed to be executing on a host 106 are actually executing and whether the tenant services 108 are healthy. The tenant management service 104 might communicate this information back to the fleet management service 102 with the status information 122.

In some configurations, one or more rules might also be provided to the tenant management service 104 for evaluation. The rules might define conditions under which tenants 108 on a host computer 106 are to be executed or deactivated. For example, a rule might specify that a certain group of tenants 108 are to be executed so long as certain resources are available (e.g. CPU or memory resources). A rule might also specify that execution of a certain tenant 108 is to be terminated if resource utilization by the tenant 108 exceeds a certain amount. Other types of rules might also be provided to the tenant management service 104 and evaluated in order to identify the tenants 108 that are to be executing on a host 106 at a given point in time.

In another configuration, the host computers 106 do not execute a tenant management service 104. In this configuration, the fleet management service 102 operates in conjunction with the software deployment service 114 to deploy tenants 108 to the appropriate hosts 106. For example, the fleet management service 102 might instruct the software deployment service 114 to deploy a certain tenant 108 to a group of host computers 106. The fleet management service 102 may select the hosts 106 to which the tenant 108 is to be deployed in the manner described above. In this example, the fleet management service 102 and the software deployment service 114 operate together to activate tenants 108 on the host computers 106.

Figure 2:
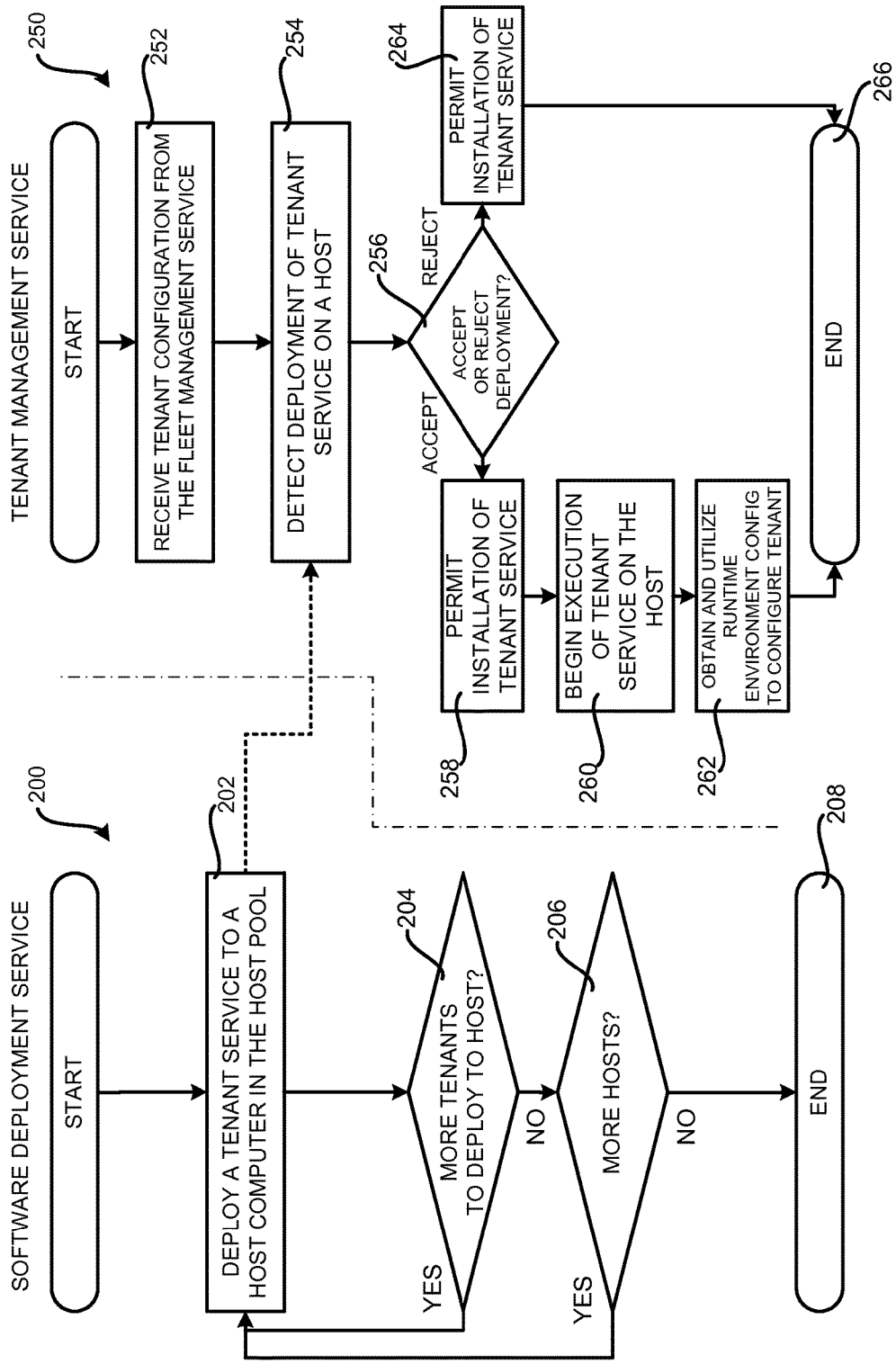
FIG. 2 includes several flow diagrams showing aspects of the operation of a software deployment service and a tenant management service for deploying and executing tenant services.

FIG. 2 includes several flow diagrams showing routines 200 and 250 that illustrate aspects of the operation of the software deployment service 114 and the tenant management service 104, respectively, for deploying and executing tenant services 108. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the software deployment service 114 deploys a tenant service to a host computer 106 in the host pool 109. For instance, in the example shown in FIG. 1, the software deployment service 114 is deploying the tenant service 108C to the host computer 106A. Once the software deployment service 114 has completed the deployment of a tenant 108 to a host computer 106, the software deployment service 114 might determine, at operation 204, whether additional tenants 108 remain to be deployed to the host 106. If so, the routine 200 proceeds from operation 204 back to operation 202, where the software deployment service 114 might deploy additional tenants 108 to the host 106.

If, at operation 204, the software deployment service 114 determines that there are no additional tenants 108 to be deployed to a host 106, the routine 200 proceeds to operation 206, where the software deployment service 114 may determine whether there are additional hosts to which the tenants 108 are to be deployed. If so, the routine 200 proceeds from operation 206 back to operation 202, where the software deployment service 114 may deploy tenants 108 to the appropriate hosts 106. If no additional tenants 108 remain to be deployed to any hosts 106, the routine 200 proceeds from operation 206 to operation 208, where it ends. It should be appreciated that the software deployment service 114 might periodically repeat the routine 200 described above to continually deploy tenants 108 to the hosts 106.

The routine 250 begins at operation 252, where an instance of the tenant management service 104 executing on a host 106 receives the tenant configuration 120 from the fleet management service 102. As discussed above, the tenant configuration 120 defines the tenants 108 that are to be executed on each host 106. From operation 252, the routine 250 proceeds to operation 254.

At operation 254, the tenant management service 104 detects a deployment of a tenant 108 to the host computer 106 upon which it is executing. In some configurations, for example, a script executed by the software deployment service 114 on the host 106 might call the tenant management service 104 in order to notify the tenant management service 114 that a deployment is in process. From operation 254, the routine 250 proceeds to operation 256.

At operation 256, the tenant management service 104 determines whether to accept or reject the deployment of the tenant 108. For example, the tenant management service 104 might consult the tenant configuration 120 to determine whether the tenant 108 that is being deployed is to be executed on the host computer 106. If the deployment is to be rejected, the routine 250 proceeds from operation 256 to operation 264, where the tenant management service 104 permits the deployment of the tenant 108 to proceed. However, the deployed tenant 108 is not executed at the time of deployment. The tenant 108 is deployed to the host 106 and may be activated at a later time by the fleet management service 102.

If, at operation 256, the tenant management service 104 determines that the deployment is to be accepted, the routine 250 proceeds to operation 258. At operation 258, the tenant management service 104 permits the installation of the tenant service 108 on the host computer 106. The routine 250 then proceeds to operation 260, where the newly deployed tenant service 108 is executed on the host computer 106. As discussed above, the tenant 108 might be executed in-process with other tenants 108 in a software container 112 or out-of-process from the other tenants 108 on the same host 106 outside of the software container 112.

From operation 260, the routine 250 proceeds to operation 262, where the newly deployed tenant 108 may obtain its runtime environment configuration 128. The runtime environment configuration 128 may then be utilized to configure aspects of the runtime operation of the newly deployed tenant 108 in the manner described above. From operations 262 and 264, the routine 250 proceeds to operation 266, where it ends.

Figure 3:
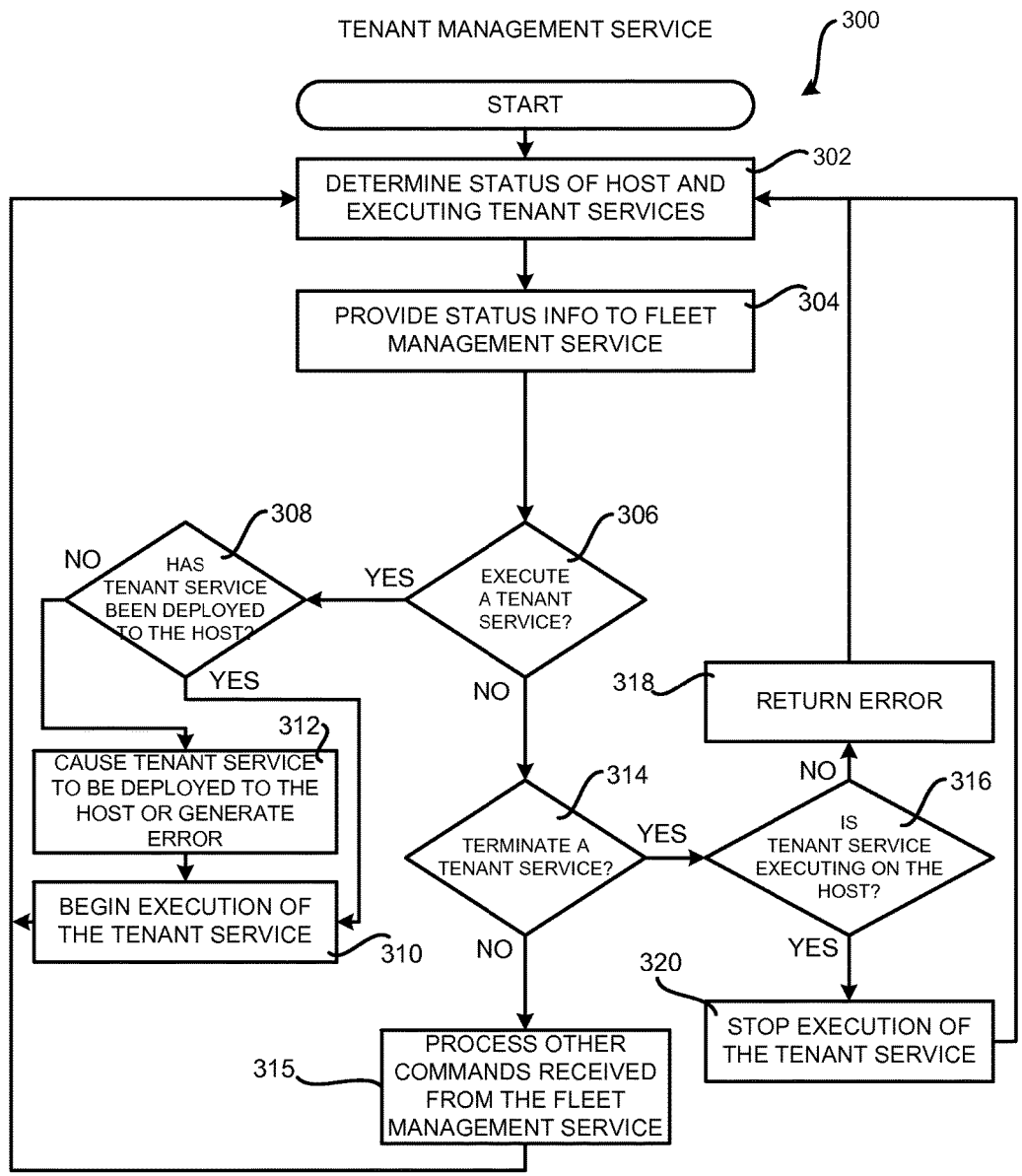
FIG. 3 is a flow diagram showing aspects of one method disclosed herein for providing a tenant management service for managing the execution of tenant services on a host computer.

FIG. 3 is a flow diagram showing aspects of one method 300 disclosed herein for providing a tenant management service 104 for managing the execution of tenant services 108 on a host computer 106. The routine 300 begins at operation 302, where the tenant management service 104 determines the status of the host computer 106 upon which it is executing and the status of the tenants 108 executing on the host computer 106. For example, and without limitation, the tenant management service 104 might determine whether all of the tenants 108 that are expected to be running on the host 106 are actually executing and the health of each tenant 108. The tenant management service 104 might also determine the resource utilization of each tenant, the resource utilization of the host 106, and/or other types of information. The tenant management service 104 may then provide the collected status information 122 to the fleet management service 104 at operation 304. The status information 122 might be stored in the tenant directory 118 or in another suitable location.

At operation 306, the tenant management service 104 determines whether a command 124 has been received from the fleet management service 102 to begin execution of a tenant service 108 that is not currently executing on the host 106. If such a command 124 has been received, the routine 300 proceeds from operation 306 to operation 308. At operation 308, the tenant management service 104 determines whether the tenant 108 to be executed was previously deployed to the host 106. If the tenant 108 to be executed was not previously deployed to the host 106, the tenant management service 104 may cause the tenant 108 to be deployed to the host 106 at operation 312. For example, the tenant management service 104 might instruct the software deployment service 114 to deploy the tenant 108 to the host 106. Alternately, the tenant management service 104 might deploy the tenant 108 to be executed to the host 106 itself. For example, the tenant management service 104 might deploy the tenant 108 to the host 106 from a network share or other location. Once the tenant 108 has been deployed to the host 106, the tenant 108 is executed in response to the command 124 received at operation 306. Alternately, the tenant management service 104 might generate an error message to the fleet management service 120 in response to determining that the fleet management service 120 has requested that a non-deployed tenant 108 be executed. The routine 300 then proceeds back to operation 302, where some or all of the operations described above may be repeated.

If, at operation 306, the tenant management service 104 determines that a command 124 to execute a tenant 108 has not been received, the routine 300 proceeds to operation 314. At operation 314, the tenant management service 104 determines whether a command 126 has been received from the fleet management service 120 to terminate the execution of a tenant 108. If so, the routine 300 proceeds to operation 316, where the tenant management service 104 may determine whether the tenant 108 to be de-activated is executing on the host 108. If the tenant 108 to be de-activated is not executing on the host 108, an error message may be returned to the fleet management service 102 at operation 318. If the tenant 108 to be de-activated is executing on the host 108, the routine 300 proceeds to operation 320, where execution of the tenant 108 identified by the command 126 received at operation 314 is terminated.

If, at operation 314, the tenant management service 104 determines that a command to terminate execution of an executing tenant service 108 has not been received, the routine 300 proceeds from operation 314 to operation 315. At operation 315, other types of commands received from the fleet management service 102 might also be processed. From operations 315, 318 and 320, the routine 300 proceeds back to operation 302, where some or all of the operations described above may be repeated.

Figure 4:
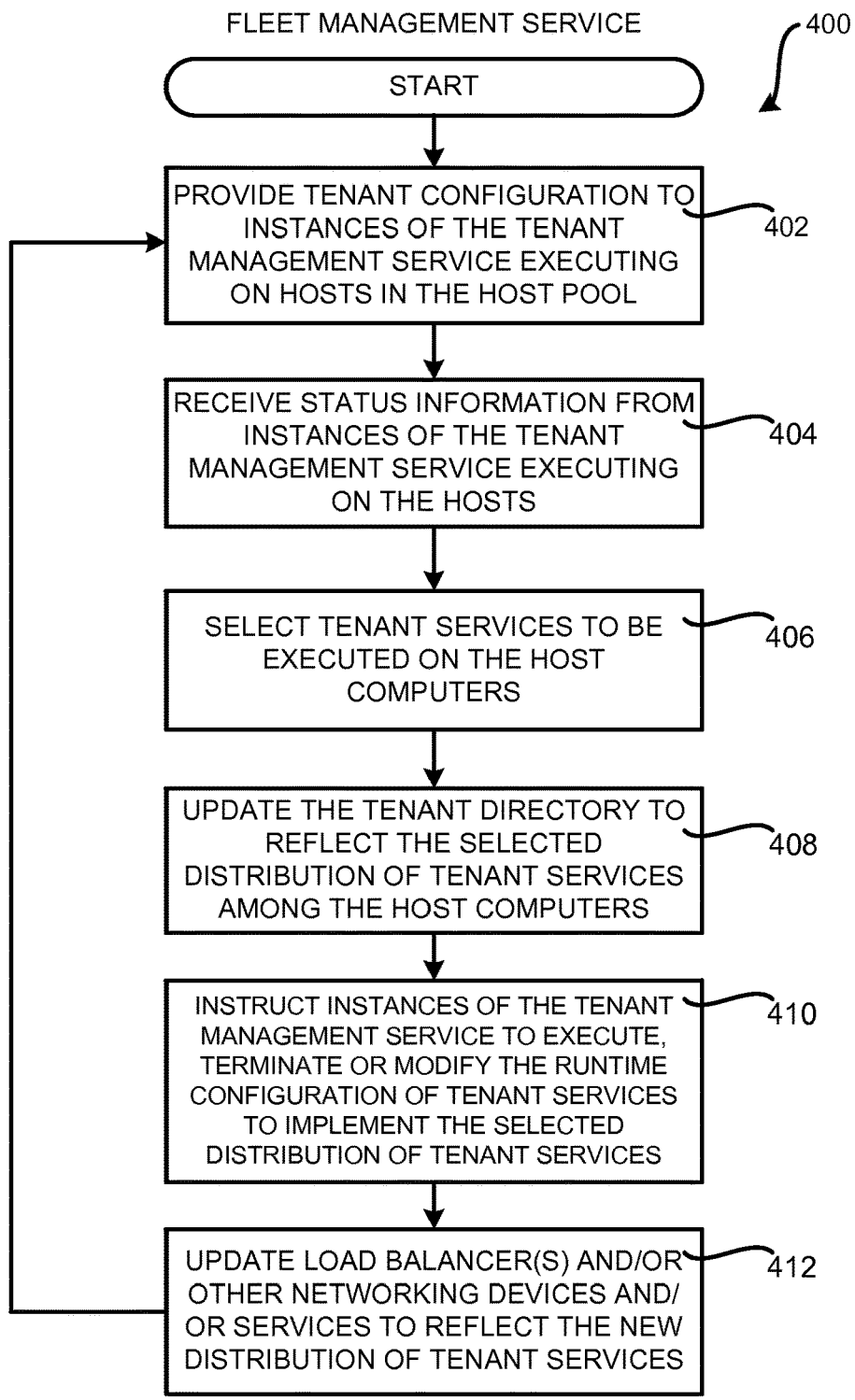
FIG. 4 is a flow diagram showing aspects of one method disclosed herein for providing a fleet management service for managing the execution of tenant services on a multitude of host computers.

FIG. 4 is a flow diagram showing aspects of one method 400 disclosed herein for providing a fleet management service 102 for managing the execution of tenant services 108 on a multitude of host computers 106A-106B in a host pool 109. The routine 400 begins at operation 402, where the fleet management service 102 provides the tenant configuration 120 to instances of the tenant management service 104 executing on host computers 106 in the host pool 109. As discussed above, the tenant configuration 120 defines the tenants 108 that are to be executed on the host computers 106. The tenant configuration 120 might also provide other information such as, but not limited to, the manner in which each tenant 108 is to be executed (e.g. within or outside of a software container 112).

From operation 402, the routine 400 proceeds to operation 404 where the fleet management service 102 receives status information 122 from the instances of the tenant management service 104 executing on the host computers 106. As discussed above, the status information 122 may provide information regarding the status of the host computers 106, the status of the tenants 108 executing on the host computers 106, and/or other types of information.

From operation 404, the routine 400 proceeds to operation 406, where the fleet management service 102 selects the tenants 108 that are to be executing on the host computers 106 in the host pool 109. As discussed above, various factors and/or considerations may be utilized to select the distribution of tenant services 108 across the available host computers 106. For example, and without limitation, the selection of tenants 108 to be executed on each host computer 106 might be based upon the status information 122, requirements specified by an owner or developer of a tenant 108, computing resources available from the host computers 106, computing resources utilized by executing and/or non-executing tenant services 108, demand for the tenant services 108, co-location and/or redundancy requirements, and/or other factors not specifically mentioned herein.

From operation 406, the routine 400 proceeds to operation 408, where the fleet management service 102 updates the contents of the tenant directory 118 to reflect the distribution of tenant services 108 selected at operation 406. The routine 400 then proceeds to operation 410, where the fleet management service 102 instructs the instances of the tenant management service 104 executing on the host computers 106 to execute tenants 108 or terminate the execution of tenants 108 in order to implement the distribution of tenant services among the host computers 106 generated at operation 406. The fleet management service 102 might also instruct the software deployment system 114 to deploy tenant services 108 to various host computers 106 in the host pool 109.

The fleet management service 102 might also provide an updated runtime environment configuration 128 to tenants 108 in order to implement the selected distribution of tenants 108. For example, and as mentioned above, a tenant 108 might be scaled on the same host computer 106 by increasing the amount of resources that may be allocated to that tenant 108. In this way, the fleet management service 102 can control where each tenant service 108 is executing and the manner in which it is executing on the host computers 106.

From operation 410, the routine 400 proceeds to operation 412, where the fleet management service 102, the tenant management service 104, the tenants 108, or the software deployment service 114 might update one or more load balancers or other types of networking devices to reflect the host computers 106 upon which the various tenant services 108 are executing. In this way, other services and/or systems can locate the tenant services 108 regardless of where the tenant services 108 are executed in the host pool 109. From operation 412, the routine 400 proceeds back to operation 402 where some or all of the operations described above may be repeated. In this way, the fleet management service can continually optimize the deployment of tenant services 108 on host computers 106 in the host pool 109.

Figure 5:
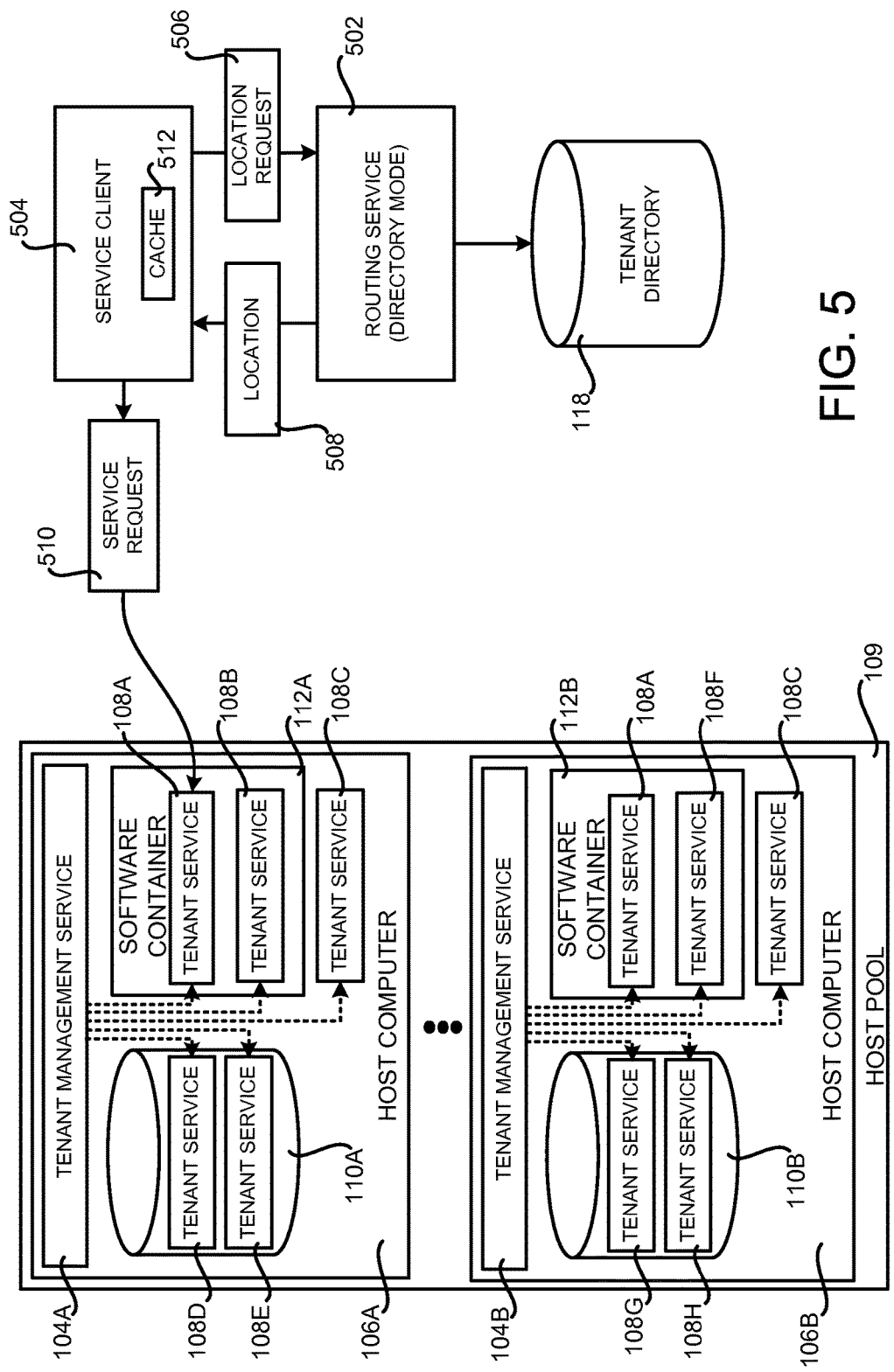
FIG. 5 is a system diagram showing aspects of the operation of a routing service operating in a directory mode of operation for providing a location of a tenant service for processing a service request.

FIG. 5 is a system diagram showing aspects of the operation of a routing service 502 configured to provide a network location 508, such as a network address or URL, of a tenant service 108 for processing a service request 510. As discussed briefly above, it may be difficult in some systems to configure service clients to access a particular network service. In one such system, for example, a configuration file that defines the network location of network services is deployed to each service client. The service clients can then utilize the provided configuration file to determine the network location of a service to be called. This mechanism, however, may be difficult to maintain, as the configuration file must be updated and re-deployed to each service client when changes are made to the distribution of the network services. The technologies illustrated in FIGS. 5-9, and described in detail below, address these and potentially other considerations. In particular, utilizing the mechanisms disclosed below with regard to FIGS. 5-9, service clients can be provided with the network location of an instance of a tenant service 108 for processing a service request 510 dynamically and at the time the service request 510 is made rather than through the use of a static configuration file.

As shown in FIG. 5, a routing service 502 is provided that exposes functionality through which a service client 504 (i.e. a client of one or more of the services 108) can obtain the network location 508 of an executing instance of a tenant service 108 for processing a service request 510 generated by the service client 504. For example, a service client 504 might provide a location request 506 (which might be referred to herein as a "request") to the routing service 502 for the network location (e.g. IP address or URL) of an instance of a tenant service 108 for handling a service request 510. In this configuration, the routing service 502 may be referred to herein as operating in a "directory mode." In the directory mode, the routing service 502 acts as a directory for locating instances of the tenant services 108.

Figure 6:
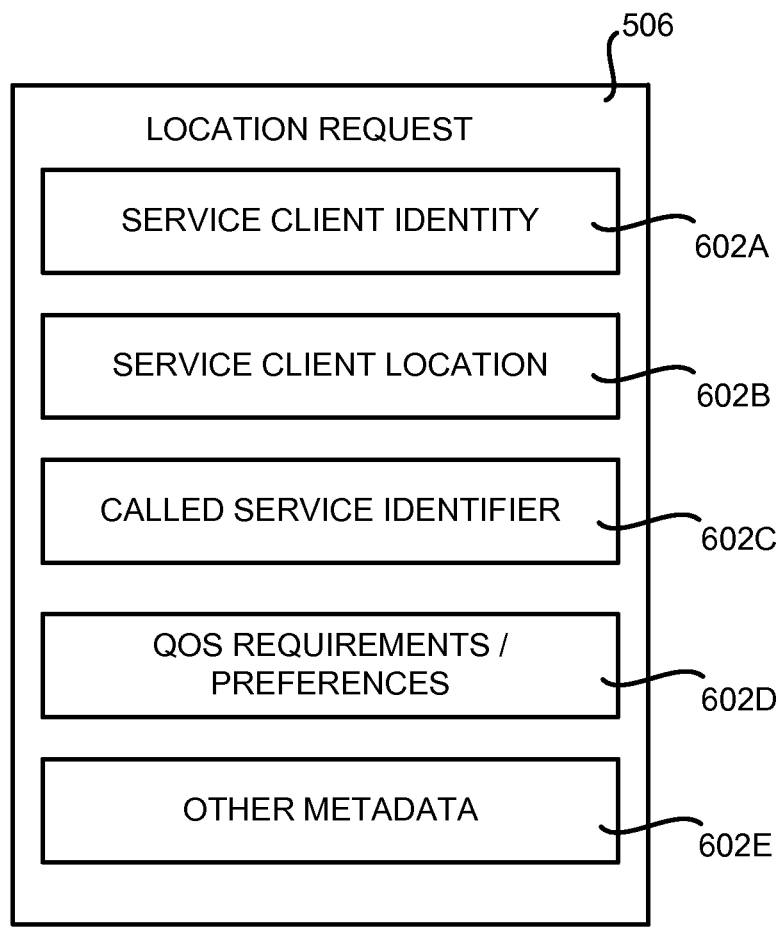
FIG. 6 is a data structure diagram showing illustrative metadata contained in a location request that may be utilized to select an instance of a tenant service for processing a service request.

In some configurations, the location request 506 submitted by the service client 504 includes metadata that describes attributes of the service client 504. FIG. 6 illustrates sample metadata that may be contained in a location request 506. For example, and without limitation, the metadata in a request 506 might include an identity 602A of the service client 504 making the service request 510. The metadata might also include a physical or logical location 602B of the service client 504. For example, and without limitation, the location 602B might specify a server computer, rack of server computers, room, data center, and/or geographic location or region in which the service client 502 is executing.

The metadata in a request 506 might also include an identifier (e.g. service name) for the tenant service 108 that the service client 504 desires to call, a version of the tenant service 108, and/or a desired location of the tenant service. The metadata might also define one or more QOS requirements or preferences 602D associated with the service client 504. For example, and without limitation, the metadata might specify that the service client requires or prefers a specified minimum network latency when communicating with the tenant service 108. Other metadata 602E describing attributes of the service client 504 might also be provided in a location request 506. As will be described in detail below, the routing service 502 might select an instance of a tenant service 108 for processing the service request 510 based, at least in part, on the metadata provided in a request 506. It should be appreciated that while the metadata describing attributes of the service client 504 is described above as being provided in a request 506, the routing service 502 might obtain metadata describing the service client 504 in other ways in other configurations.

It should be appreciated that the routing service 502 might also utilize other types of information when selecting an instance of a tenant service 108 for processing a service request 510. For example, and without limitation, the routing service 502 might utilize attributes associated with the available instances of the tenant service 108 in the selection process, such as some or all of the status information 122 provided by the tenant management service 104 described above. As discussed above, the status information 122 may be stored in the tenant directory 118, and may indicate aspects of the operational status of the host computers 106 and/or the tenants 108 executing thereupon. For example, status information 122 might be stored in the tenant directory 118 or otherwise obtained from the hosts 106 that indicates the computing resources (e.g. CPU, memory, network bandwidth, etc.) available from a host computer 106 and/or resources utilized by each of the tenants 108 executing on the host computer.

The routing service 502 might also utilize other attributes associated with the available instances of the tenant service 108 such as, but not limited to, the physical or logical location of the executing instances of the tenant service 108. For example, and without limitation, the selection of an instance of a tenant service 108 might be made based upon the location of the computer executing the instance in a rack of server computers, room, data center, and/or geographic location or region. Using some of this information, the routing service might select an instance of the tenant service 108 based upon locality (e.g. the service client 504 is in the same data center as the instance of the tenant service 108), regionality (e.g. the service client 504 is in the same geographic region as the instance of the tenant service 108), and/or other considerations.

The routing service 502 might also base a selection of an instance of a tenant service 108 on the resource utilization of host computers 106 executing the instances of the tenant service 108. For example, an instance of a tenant service 108 executing on a host computer 106 might be selected that has resource utilization that is lower than another host computer 106 executing another instance of the same tenant service 108. Similarly, a volume of service requests being processed by the instances of the tenant service 108 might be utilized in a similar manner to select an instance of a tenant 108 for processing a request 510 that is receiving a lower volume of service requests. In a similar fashion, the routing service 502 might also base a selection of an instance of a tenant service 108 on other types of metrics associated with the host computers 106 and/or the tenant services 108, such as the past requests made by a service client and the responses made by a tenant service 108. For example, and without limitation, if a significant percentage of requests generated by a particular service client are generating exceptions, the routing service 502 may elect to isolate services requests made by the client.

The routing service 502 might also base a selection of an instance of a tenant service 108 on a type associated with the instances of the tenant service 108. For example, some of the instances of the tenant service 108 might be designated as "production" instances that serve live customer network traffic. Other executing instances of the tenant service 108 might be designated as "development" instances that are utilized for testing purposes. Based upon this type designation, the routing service 502 might choose to route a certain percentage of service requests 510 to development instances of the tenant service 108 for testing purposes.

By utilizing some or all of the information described above in order to select an instance of a tenant service 108 to process a service request 510, various types of functionality might be achieved. For example, and without limitation, segmentation of service requests 510 generated by a multitude of service clients 504 might be implemented. As mentioned briefly above, segmentation refers to a process of providing some service requests 510 to one group of instances of a tenant service 108 while providing other service requests 510 to another group of instances of the tenant service 108.

For example, and without limitation, "A/B" testing of different versions of a tenant service 108 might be enabled by selecting instances of one version of the tenant service 108 to process some service requests 510 and selecting instances of another version of the tenant service 108 to process other service requests 510. In this way, service requests 510 can be segmented based upon the currently executing version of a tenant service 108.

The routing service 502 might also select an instance of a tenant service 108 to process a service request 510 in order to implement load balancing between available instances of a tenant service 108. For example, the routing service 502 might select instances of a tenant service 108 to process consecutive service requests 510 utilizing a "round-robin" algorithm or other type of algorithm. Load balancing of service requests 510 in this manner might also be made based upon other considerations, such as the request rate to the instances of tenant service 108, available network bandwidth, and other criteria.

The routing service 502 might also select instances of a tenant service 108 in order to gradually deploy new versions of a tenant service 108 to a fleet of hosts 106. For example, and without limitation, the routing service 502 might initially route service requests 510 to a small number of hosts 106 executing a tenant service 108. Over time, the routing service 502 might increase the number of service requests 510 routed to instances of the tenant service 108 executing the new version until no service requests 510 are routed to instances of the tenant service 108 executing the previous version.

Once the routing service 502 has selected an instance of a tenant service 108 for processing a service request 510, the routing service may provide the network location 508 of the selected instance of the tenant service 108 to the service client 504 in response to the request 506. For example, and without limitation, the routing service 502 might provide an IP address or a URL for the selected instance of the tenant service 108 in response to the request 502. As discussed above, the tenant directory 118 may store data identifying the current distribution of tenant services 108 to host computers 106 in the pool 109. For example, and without limitation, the tenant directory 118 may store data providing a mapping between the instances of each tenant service 108 and the network addresses of the host computers 106 upon which they are executing. This data may be utilized to obtain the network location 508 of the selected instance of the tenant service 108 for provision to the service client 504.

Once the routing service 502 has provided the service client 504 with the network location 508 of the selected instance of the tenant service 108, the service client 504 might then utilize the provided network location 508 to make a service request 510 to the selected instance of the tenant service 108. In the example shown in FIG. 5, for instance, the routing service 502 has selected the instance of the tenant service 108A executing on the host computer 106A for processing the service request 510. Accordingly, the service client 504 has submitted the service request 510 to the instance of the tenant service 108A executing on the host computer 106A for processing. The service client 504 might also store the provided network location in a local storage cache 512 for future use. Additional details regarding the mechanism described above with regard to FIG. 5 will be provided below with regard to FIG. 8.

It should be appreciated that while FIG. 5 illustrates the routing service 502 providing a single location 508 to the service client 504, in some configurations the routing service 502 might provide locations 508 for two or more instances of the tenant service 108. The service client 504 might then transmit a service request 510 to the multiple instances of the tenant service 108. In some embodiments, the service client 504 utilizes the first service request 510 received from the called instances of the tenant service 108. In this way, a service client 504 may implement a "shadow mode" of operation. As will be described below, the routing service 502 might also implement a shadow mode in some configurations.

As shown in FIG. 5 and described briefly above, the service client 504 might maintain a cache 512 of locations of tenant services 108. In one configuration, a process executing on the service client 504 is configured to pre-populate the cache 512 with the network locations of instances of tenant services 108 for processing future service requests 510. For example, if the tenant services 108 utilized by a service client 504 are known in advance (i.e. prior to a service request 510 being made), network locations 508 of instances of the tenant services 108 can be obtained and stored in the cache 512. These pre-stored network locations may then be utilized to satisfy future service requests 510. This configuration may limit the ability of the routing service 502 somewhat to select the most appropriate instance of a tenant service 108 for processing a particular service request 510. However, this configuration may also reduce the time required to obtain a location 508 for an instance of a tenant service 108 at the time a service request 510 is made.

Figure 7:
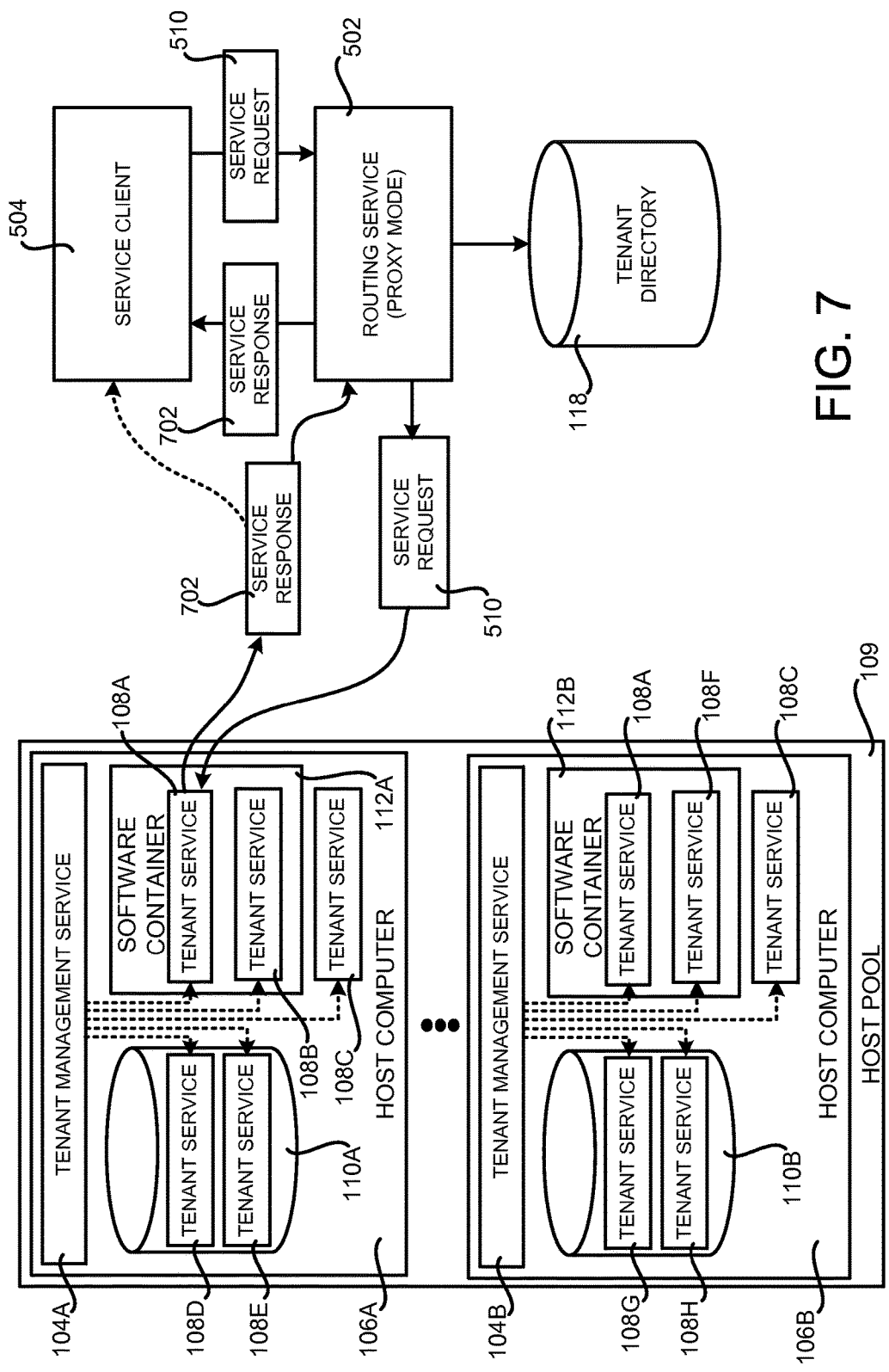
FIG. 7 is a system diagram showing aspects of the operation of a routing service operating in a proxy mode for routing service requests to tenant services.

FIG. 7 is a system diagram showing aspects of the operation of the routing service 502 when operating in a proxy mode of operation. In this mode of operation, the routing service 502 is configured to act as a proxy for routing service requests 510 to tenant services 108. As shown in FIG. 7, a service client 504 may provide a service request 510 to the routing service 502. The service request 510 may include some or all of the metadata described above with regard to FIG. 6 including, but not limited to, an identifier 602C for the tenant service 108 that is to be called. Other types of metadata describing attributes of the service client 504 might also be obtained by the routing service 502 in other ways.

In response to receiving a service request 510, the routing service 502 may select an executing instance of a tenant service 108 to process the service request 510 generated by the service client 504 in the manner described above with regard to FIG. 5. As discussed above, attributes of the service client 504, attributes of the available instances of the tenant service 108, and/or other factors may be utilized to select an instance of a tenant service 108 to process the service request 510.

Once an instance of the tenant service 108 has been selected for processing the service request 510, the routing service 502 provides the service request 510 to the selected instance of the tenant service 108 for processing. As discussed above, the routing service 502 may identify the network location of the selected instance of the tenant service 108 utilizing data stored in the tenant directory 118 or from another source. The tenant service 108 may then process the service request 510 and provide a service response 702 to the routing service 502. In turn, the routing service 502 may provide the service response 702 to the service client 504 in reply to the original service request 510. Alternately, a tenant service 108 might provide the service response 702 directly to the service client 504.

In some configurations, the routing service 502 might also be configured to also provide service requests 510 received from service clients 504 to one or more other services in addition to the target instance of the tenant service 108. For example, and without limitation, the routing service 502 might be configured to also provide service requests 510 to a logging service (not shown in FIG. 7) for logging service requests 510 received by the routing service 502. As another example, the routing service 502 might be configured to provide a service request 510 to two or more instances of a tenant service 108. The first service response 702 received from one of the instances of the tenant service 108 may then be provided to the service client 504. The routing service 502 might also provide service requests 510 to other types of services in other configurations to provide other types of functionality. Additional details regarding the mechanism described above with regard to FIG. 7 will be provided below with regard to FIG. 9.

It should be appreciated that while the routing service 502 is illustrated in FIGS. 5 and 7 as being located outside of the host computers 104, the routing service 502 might be executed on one or more of the host computers 106 in some configurations. For example, and without limitation, the routing service 502 might be implemented as a tenant service 108 in one specific configuration. The routing service 502 might also be executed by other computer systems in other embodiments.

Figure 8:
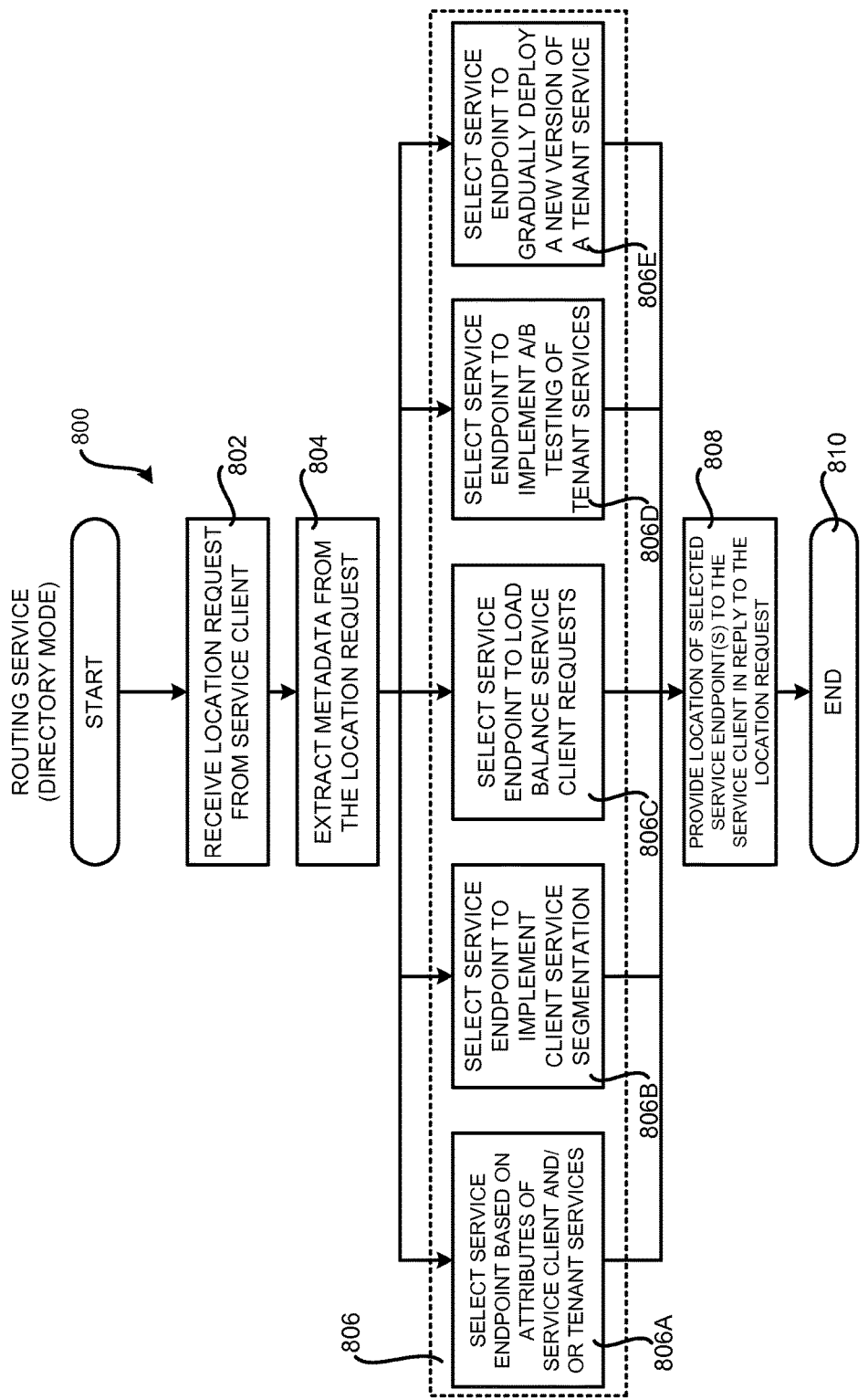
FIG. 8 is a flow diagram showing a method that illustrates aspects of the operation of a routing service in a directory mode of operation.

FIG. 8 is a flow diagram showing a method 800 that illustrates aspects of the operation of the routing service 502 in the directory mode of operation discussed above with regard to FIG. 5. The routine 800 begins at operation 802, where the routing service 502 receives a location request 506 from a service client 504. The routine 800 then proceeds from operation 802 to operation 804, where the routing service 502 retrieves the metadata from the location request 506 describing the attributes of the service client 504. As discussed above, the metadata may describe various attributes of the service client such as, but not limited to, an identity 602A of the service client 504 making the request 510, a location 602B of the service client 510, an identifier 602C (e.g. service name) for the tenant service 108 to be called, and/or one or more QOS requirements or preferences 602D associated with the service client 502. The metadata might also specify other attributes associated with the service client 502 and might be obtained in ways other than from the location request 506.

From operation 804, the routine 800 proceeds to operation 806, where the routing service 502 selects an instance of an executing tenant service 108 to service the service request 510. As discussed above with regard to FIG. 5, the selection of the instance of the tenant service 108 might be made based upon various factors and/or to provide various types of functionality. For example, and without limitation, at operation 806A, an instance of a tenant service 108 might be selected based, at least in part, upon attributes associated with the service client 504 and/or attributes associated with the executing instances of the tenant service 108. For example, the routing service might select an instance of the tenant service 108 based upon locality (e.g. the service client 504 is in the same data center as the instance of the tenant service 108), regionality (e.g. the service client 504 is in the same geographic region as the instance of the tenant service 108), in order to provide redundancy, and/or other considerations. As discussed above, the routing service 502 might also select the instance of the tenant service 108 based upon the current request rate or load on the host computers 106 and/or the instances of the service tenants 108 executing thereupon.

Alternately, or additionally, the routing service 502 might select an instance of the specified tenant service 108 in order to implement client service segmentation at operation 806B. For example, the routing service 502 might select an instance of the tenant service 108 in order to implement segmentation based upon type of the tenant service (e.g. production or development), the volume of requests being directed to the instances of the tenant service, the latency or QOS requirements of the service client 504, locality and/or regionality, resource utilization of host computers 106, and/or the use case of the service request 510. The routing service 502 might also segment service requests 510 based upon other criteria not specifically identified herein.

Alternately, or additionally, the routing service 502 might select an instance of the specified tenant service 108 in order to implement load balancing between instances of a tenant service 108 at operation 806C. For example, and as described above, the routing service 502 might select different instances of a tenant service 108 to process consecutive service requests 510 utilizing a "round-robin" algorithm or another type of load balancing algorithm. The routing service 502 might also load balance service requests 510 based upon other considerations, such as the request rate to the instances of tenant service 108, available network bandwidth, and/or other criteria. Various mechanisms for automatically changing load balancing algorithms to optimize availability and performance might also be utilized. Such mechanisms are described in U.S. patent application Ser. No. 14/133,529, which was filed on Dec. 18, 2013 and entitled "Optimizing a Load Balancer Configuration" and which is expressly incorporated by reference herein in its entirety.

Alternately, or additionally, the routing service 502 might select an instance of the specified tenant service 108 in order to enable A/B testing of different versions of a tenant service 108 at operation 806D. As discussed above, A/B testing of different versions of a tenant service 108 might be enabled by selecting instances of one version of the tenant service 108 to process some service requests 510 and selecting instances of another version of the same tenant service 108 to process other service requests 510. In this way, service requests 510 can be segmented based upon the currently executing version of a tenant service 108. Testing of the execution of each version of the tenant service 108 can be made independently.

Alternately, or additionally, the routing service 502 might select an instance of the specified tenant service 108 in order to enable the gradual deployment of a new version of a tenant service 108 at operation 806E. As discussed above, the routing service 502 might initially route service requests 510 to a small number of hosts 106 executing a tenant service 108. Over time, the routing service 502 might increase the number of service requests 510 routed to instances of the tenant service 108 executing the new version until no service requests 510 are routed to instances of the tenant service 108 executing the previous version.

It should be appreciated that the various factors and/or considerations utilized in the selection of an instance of a tenant service 108 described above with regard to operation 806 are merely illustrative and that various other factors and or considerations might be utilized. For example, in other configurations the routing service 502 might select an instance of the specified tenant service 108 based upon a payload of a service request 510, based upon previous routing decisions, and/or other considerations.

From operation 806, the routine 800 proceeds to operation 808, where the routing service 502 provides the location 508 of the selected instance, or instances, of the tenant service 108 to the calling service client 504. As discussed above, the network location 508 of the selected instance, or instances, of the tenant service 108 might be obtained from the tenant directory 118 or in another manner. From operation 808, the routine 800 proceeds to operation 810, where it ends.

Alternately, the routine 800 may proceed back to operation 802, where additional location requests 506 might be processed in a similar fashion.

Figure 9:
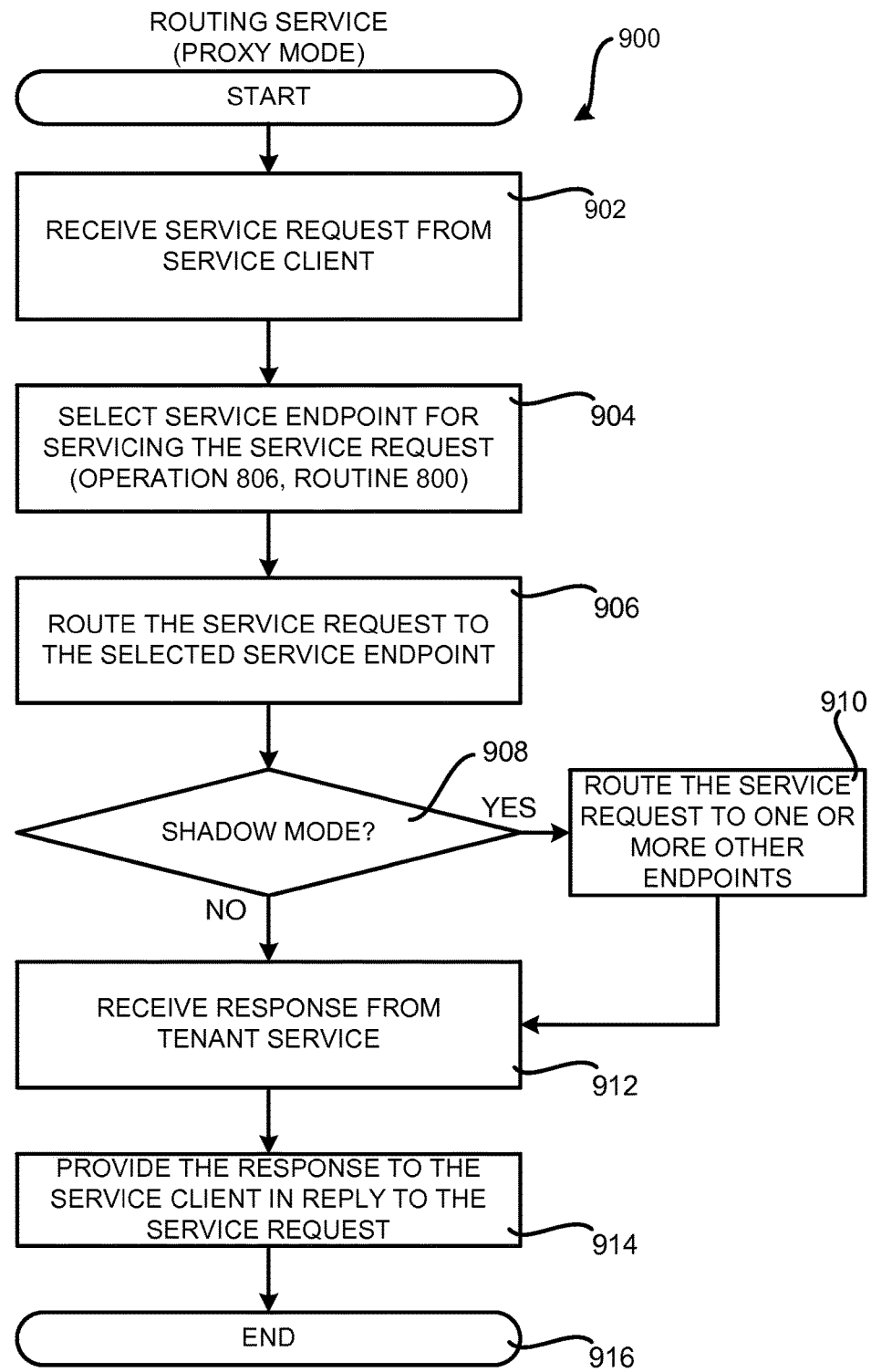
FIG. 9 is a flow diagram showing a method that illustrates aspects of the operation of a routing service in a proxy mode of operation.

FIG. 9 is a flow diagram showing a method 900 that illustrates aspects of the operation of the routing service 502 in the proxy mode of operation described above with regard to FIG. 7. The routine 900 begins at operation 902, where the routing service 502 receives a service request 510 from a service client 504. The routine 900 then proceeds to operation 904, where the routing service 502 selects an instance of a tenant service 108 for servicing the service request 510. The instance of the tenant service 108 may be selected in the manner described above with regard to FIG. 5 and further with regard to operation 806 of the routine 800 shown in FIG. 8.

Once an instance of the tenant service 108 specified in the service request 510 has been selected, the routine 900 proceeds from operation 904 to operation 906. At operation 906, the routing service 502 routes the service request 510 to the selected instance of the tenant service 108. As discussed above, the network address of the selected instance of the tenant service 108 might be obtained from the tenant directory 118 or from another location or service.

From operation 906, the routine 900 proceeds to operation 908, where the routing service 502 determines whether the service request 510 should be routed to any other services or destinations. As discussed above with regard to FIG. 7, the routing service 502 might be configured to also provide service requests 510 received from service clients 504 to one or more other services in addition to the selected instance of the tenant service 108. For example, the routing service 502 might be configured to also provide service requests 510 to a logging service for logging service requests 510 received by the routing service 502. As another example, and as discussed above, the routing service 502 might be configured to provide a service request 510 to two or more instances of a tenant service 108. The first service response 702 received from one of the instances of the tenant service 108 may then be provided to the service client 504.

If the routing service 502 is configured to "shadow" the routing of the service request 510 in this manner, the routine 900 proceeds from operation 908 to operation 910. At operation 910, the routing service 502 routes the service request 510 to one or more endpoints in the manner described above. For example, and as described above, the routing service 502 might route a service request 510 to two or more instances of a tenant service 108. The routing service 502 might also route a service request 510 to other types of endpoints in addition to a selected instance of a tenant service 108.

From operation 910, the routine 900 proceeds to operation 912, where the routing service 502 receives a service response 702 from the instance of the tenant service 108 to which the service request 510 was routed. The routine 900 then proceeds to operation 914, where the routing service 502 provides the service response 702 to the service client 504 in reply to the original service request 510. From operation 914, the routine 900 proceeds to operation 916, where it ends.

It should be appreciated that the routing service 502 described above might also be utilized to provide other types of functionality in other configurations. For example, and without limitation, the routing service 502 might be utilized to aid in service application programming interface ("API") evolution. For example, instances of the same tenant service 108 that utilize different service APIs (e.g. parameters and returns) might be registered with the routing service 502. For each request made to the routing service 502, a determination could be made as to which instance of the tenant service 108, and therefore which API, to utilize. This configuration may eliminate the requirement that API changes remain backward compatible by maintaining executing instances of a tenant service 108 that support a deprecated API along with instances of the tenant service 108 that support a newer API. Requests could be routed to the appropriate endpoint based upon the version of the API required. Other configurations might also be utilized.

Figure 10:
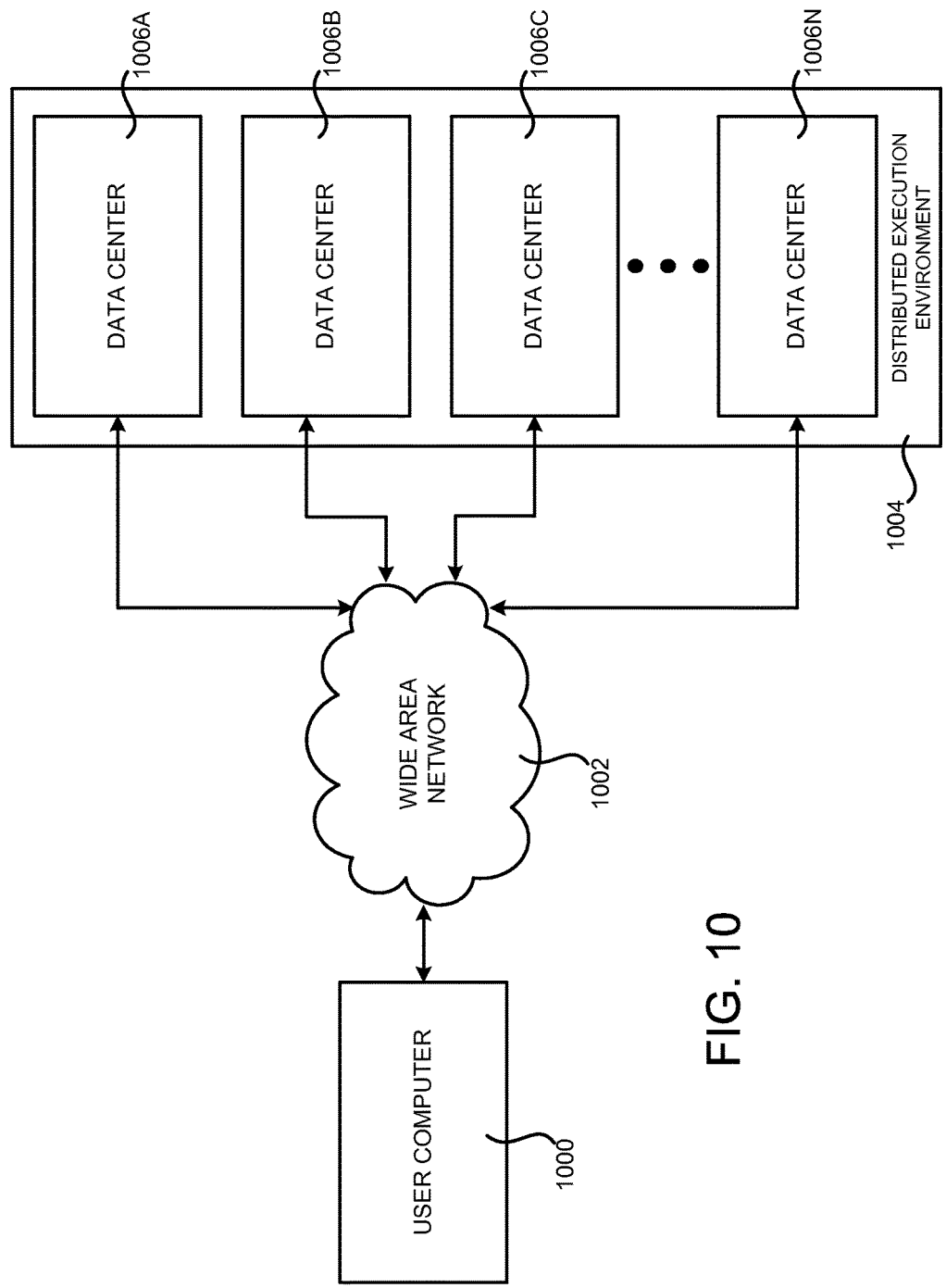
FIG. 10 is a system and network diagram that shows aspects of one illustrative operating environment for the technologies disclosed herein that includes a distributed execution environment that may be utilized to execute the software components described herein.

FIG. 10 and the following description are intended to provide a brief, general description of a suitable computing environment in which the technologies described herein may be implemented. In particular, FIG. 10 is a system and network diagram that shows an illustrative operating environment that includes a distributed execution environment 1004. As discussed briefly above, a distributed execution environment such as that shown in FIG. 10 may be utilized to implement the functionality disclosed herein. By implementing the disclosed functionality in a distributed computing environment such as that illustrated in FIGS. 10 and 11, the technologies described above may be implemented in a way that is scalable, reliable, and secure.

The computing resources provided by the distributed execution environment 1004 may include various types of resources, such as data processing resources, data storage resources, networking resources, data communication resources, and the like. Each type of computing resource may be general-purpose or may be available in a number of specific configurations. For example, data processing resources may be available as virtual machine instances in a number of different configurations.

The virtual machine instances may be configured to execute applications, including Web servers, application servers, media servers, database servers, and other types of applications. The virtual machine instances might also be configured to execute the tenant management service 104, the tenants 108, software containers 112, the fleet management service 102, the software deployment service 114, the routing service 502, service clients 504, and/or any of the other software components described herein. Data storage resources may include file storage devices, block storage devices, and the like. Each type or configuration of a computing resource may be available in different sizes, such as large resources, consisting of many processors, large amounts of memory, and/or large storage capacity, and small resources consisting of fewer processors, smaller amounts of memory, and/or smaller storage capacity.

As also mentioned above, the computing resources provided by the distributed execution environment 1004 are enabled in one implementation by one or more data centers 1006A-1006N (which may be referred to herein singularly as "a data center 1006" or collectively as "the data centers 1006"). The data centers 1006 are facilities utilized to house and operate computer systems and associated components. The data centers 1006 typically include redundant and backup power, communications, cooling, and security systems. The data centers 1006 might also be located in geographically disparate locations. One illustrative configuration for a data center 1006 that may be utilized to implement the concepts and technologies disclosed herein will be described below with regard to FIG. 11.

Users of the distributed execution environment 1004 may access the computing resources provided by the data centers 1006 over a suitable data communications network, such as a Wide Area Network ("WAN") 1002. For example, and as shown in FIG. 10, a user of functionality provided by one or more tenant services 108 might utilize an appropriate user computer 1000 to access and utilize the services described herein. Although a WAN 1002 is illustrated in FIG. 10, it should be appreciated that a local-area network ("LAN"), the Internet, or any other networking topology known in the art that connects the data centers 1006 with other networks and/or computing devices, such as the user computer 1000, may be utilized. It should also be appreciated that combinations of such networks might also be utilized.

Figure 11:
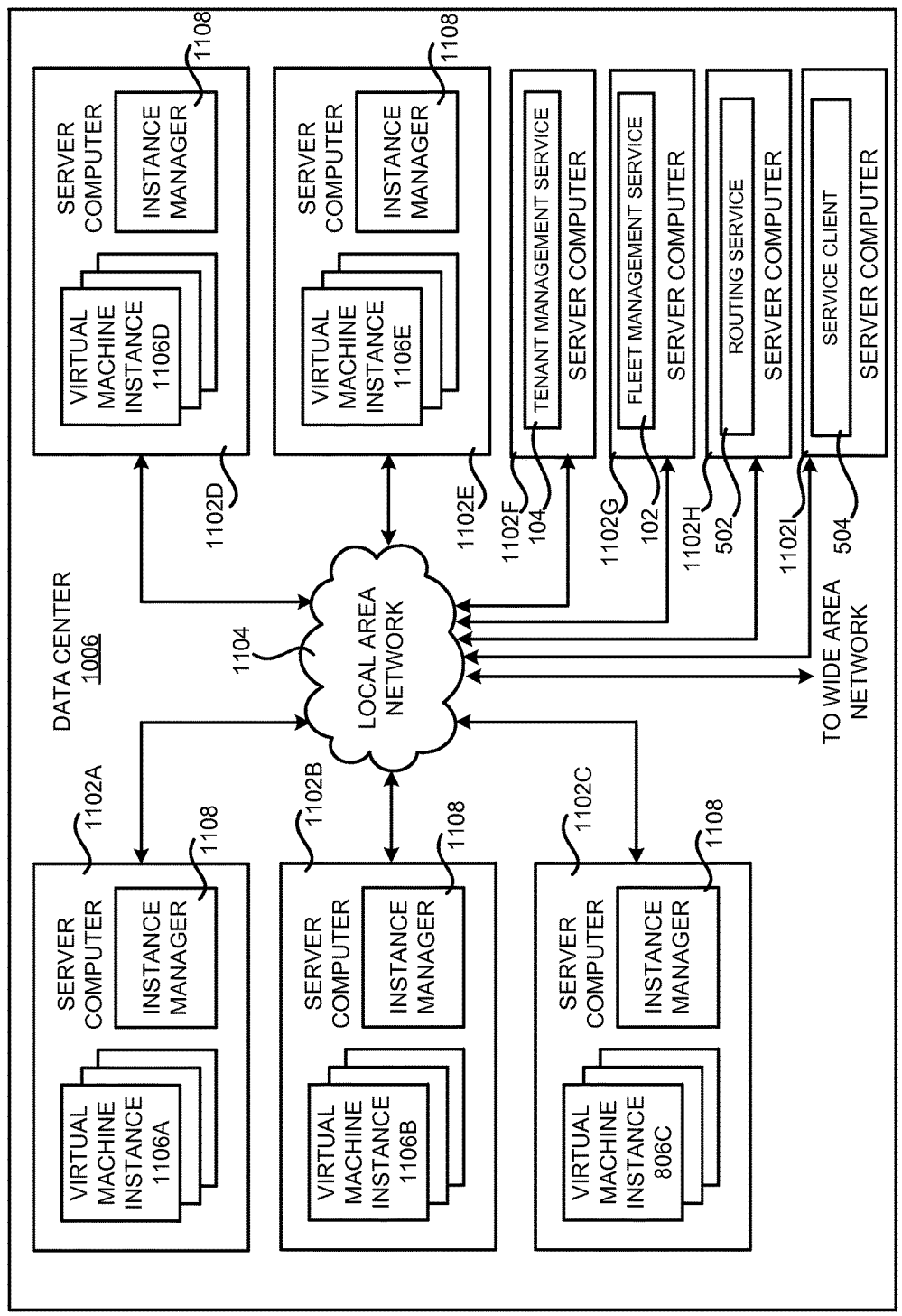
FIG. 11 is a computing system diagram that illustrates one configuration for a data center that may be utilized to implement aspects of the technologies disclosed herein.

FIG. 11 is a computing system diagram that illustrates one configuration for a data center 1006 that implements aspects of the distributed execution environment 1004 for implementing the technologies disclosed herein. The example data center 1006 shown in FIG. 11 includes several server computers 1102A-1102I (which may be referred to herein singularly as "a server computer 1102" or in the plural as "the server computers 1102"). The server computers 1102 may be standard tower or rack-mount server computers configured appropriately for providing the computing resources described herein. It should be appreciated that the server computers 1102 shown in FIG. 11 might be located in the same or different racks or in the same or different rooms of the data center 1006.

In one implementation, the server computers 1102 are configured to provide virtual machine instances 1106A-1106E for executing the software components described above. As known in the art, a virtual machine instance is an instance of a software implementation of a machine (i.e. a computer) that executes programs like a physical machine. Each of the servers 1102 may be configured to execute an instance manager 1108 capable of instantiating and managing the virtual machine instances 1106. The instance manager 1108 might be a hypervisor or another type of program configured to enable the execution of multiple virtual machine instances 1106 on a single server 1102, for example.

It should be appreciated that although the technologies disclosed herein may be described in the context of virtual machine instances 1106, other types of computing resources can be utilized to implement the various concepts and technologies disclosed herein. For example, the technologies disclosed herein might be implemented using hardware resources, data storage resources, data communications resources, networking resources, database resources, and other types of computing resources provided by the data center 1006.

The server computers 1102 may be configured to execute some or all of the software components described above. For example, various server computers 1102 may be configured to execute the tenant management service 104, the fleet management service 102, the routing service 502, a service client 504 and/or any of the other software components described above. In the configuration shown in FIG. 11, for example, the server computer 1102F is configured to execute the tenant management service 142, the server computer 1102G is configured to execute the fleet management service 102, the server computer 1102H is configured to execute the routing service 502, and the server computer 1102I is configured to execute the service client 504. These services, and the others described herein, might also be executed on other server computers 1102 in the data center 1106 and/or other data centers. These services might be executed in virtual machine instances 1106 or directly on hardware as illustrated in FIG. 11.

Resources in the data center 1006 used to provide the functionality described above, such as virtual machine instances 1106, may be scaled in response to demand. In this regard, it should be appreciated that while the software components described above are illustrated as executing within the distributed execution environment 1004, computing systems that are external to the distributed execution environment 1004 might also be utilized to execute some or all of these components. Other configurations might also be utilized.

In the example data center 1006 shown in FIG. 11, an appropriate LAN 1104 is utilized to interconnect the server computers 1102A-1102I. The LAN 1104 is also connected to the WAN 1002 illustrated in FIG. 10. It should be appreciated that the system configuration and network topology illustrated in FIGS. 10 and 11 has been greatly simplified and that many more computing systems, networks, and networking devices may be utilized to interconnect the various computing systems disclosed herein. Appropriate load balancing devices and/or software modules might also be utilized for balancing a load between each of the data centers 1006A-1006N, between each of the server computers 1102A-1102I in each data center 1006, between virtual machine instances 1106, and between server computers 1102A-1102I.

It should be appreciated that the data center 1006 shown in FIG. 11 and described above is merely illustrative and that other implementations might be utilized. In particular, some or all of the functionality described herein as being performed by the tenant management service 104, the tenants 108, the fleet management service 102, the software deployment service 114, the routing service 502, and/or the service clients 504 might be performed by one another, might be performed by other components, or might be performed by a combination of these or other components. Additionally, it should be appreciated that the functionality provided by these components might be implemented in software, hardware, or a combination of software and hardware. Other implementations should be apparent to those skilled in the art.

Figure 12:
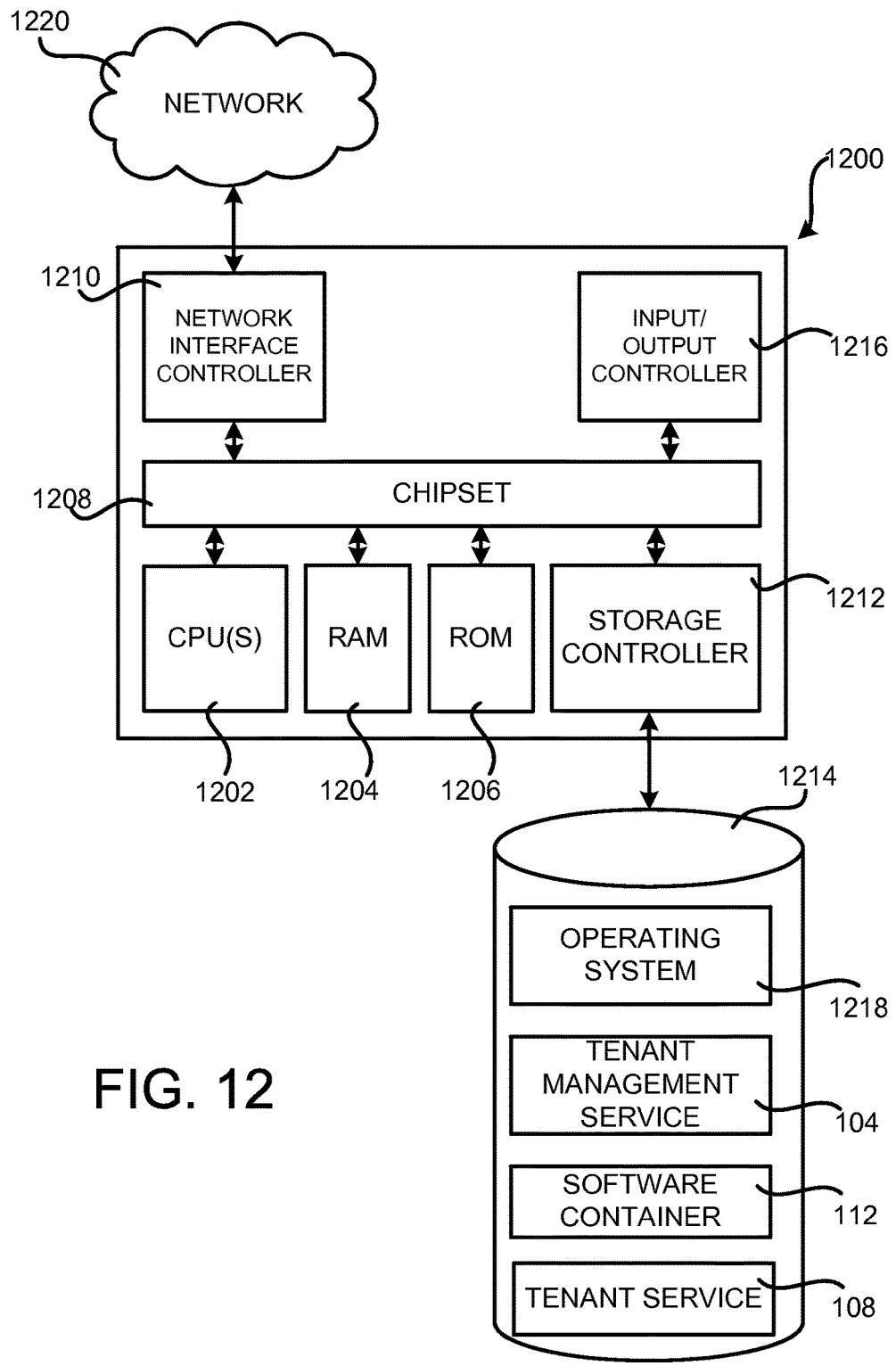
FIG. 12 is a computer architecture diagram showing an illustrative computer hardware architecture for implementing computing devices described herein.

FIG. 12 shows an example computer architecture for a computer 1200 capable of executing the software components described herein. The computer architecture shown in FIG. 12 illustrates a conventional server computer, workstation, desktop computer, laptop, network appliance, tablet computing device, electronic book reader, smart telephone, or other computing device, and may be utilized to execute any aspects of the software components presented herein and discussed above with regard to FIGS. 1-11.

The computer 1200 includes a baseboard, or "motherboard," which is a printed circuit board to which a multitude of components or devices may be connected by way of a system bus or other electrical communication paths. In one illustrative configuration, one or more central processing units ("CPUs") 1202 operate in conjunction with a chipset 1208. The CPUs 1202 are standard programmable processors that perform arithmetic and logical operations necessary for the operation of the computer 1200.

The CPUs 1202 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1208 provides an interface between the CPUs 1202 and other components and devices on the baseboard. For instance, the chipset 1208 may provide an interface to a random access memory ("RAM") 1204, used as the main memory in the computer 1200. The chipset 1208 may further provide an interface to a computer-readable storage medium such as a read-only memory ("ROM") 1206 or non-volatile RAM ("NVRAM") for storing basic routines that help to startup the computer 1200 and to transfer information between the various components and devices. The ROM 1206 or NVRAM may also store other software components necessary for the operation of the computer 1200 in accordance with the various configurations described herein.

The computer 1200 may also operate in a networked environment using logical connections to remote computing devices and computer systems through the network 1220, such as a LAN, a WAN, the Internet, or any other networking topology known in the art that connects the computer 1200 to remote computers. The chipset 1208 includes functionality for providing network connectivity through a network interface controller ("NIC") 1210, such as a gigabit Ethernet adapter. The NIC 1210 is capable of connecting the computer 1200 to other computing devices over the network 1220. It should be appreciated that any number of NICs 1210 may be present in the computer 1200, connecting the computer 1200 to various types of networks and remote computer systems.

The computer 1200 may be connected to a mass storage device 1214 that provides non-volatile storage for the computer 1200. The mass storage device 1214 may store system programs, application programs, other program modules, and data, which are described in greater detail herein. The mass storage device 1214 may be connected to the computer 1200 through a storage controller 1212 connected to the chipset 1208. The mass storage device 1214 may consist of one or more physical storage units. The storage controller 1212 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 1200 may store data on the mass storage device 1214 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1214 is characterized as primary or secondary storage, and the like.

For example, the computer 1200 may store information to the mass storage device 1214 by issuing instructions through the storage controller 1212 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1214 by detecting the physical states or characteristics of one or more particular locations within the physical storage units.

In addition to the mass storage device 1214 described above, the computer 1200 may have access to other computer-readable storage media to store and retrieve information, such as program modules, data structures, or other data. It should be appreciated by those skilled in the art that computer-readable storage media can be any available non-transitory media that may be accessed by the computer 1200. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1214 may store an operating system 1218 utilized to control the operation of the computer 1200. In one configuration the operating system comprises the LINUX operating system. According to another configuration, the operating system comprises one of the family of WINDOWS operating systems from MICROSOFT Corporation of Redmond, Wash. According to other configurations, the operating system comprises the UNIX operating system, the LINUX operating system, or a variant thereof. It should be appreciated that other operating systems may also be utilized. The mass storage device 1214 may store other system or application programs and data utilized by the computer 1200. For example, the mass storage device 1214 might store the tenant management service 104, the tenants 108, the fleet management service 102, a software container 112, the routing service 502, a service client 502, and/or the software deployment service 114 in various configurations.

In one configuration, the mass storage device 1214 or other computer-readable storage media are encoded with computer-executable instructions that, when loaded into the computer 1200, may transform the computer from a general-purpose computing system into a special-purpose computer capable of implementing the technologies described herein. These computer-executable instructions transform the computer 1200 by specifying how the CPUs 1202 transition between states, as described above. According to one configuration, the computer 1200 has access to computer-readable storage media storing computer-executable instructions which, when executed by the computer 1200 (i.e. the CPUs 1202), perform some or all of the operations described above with respect to FIGS. 2-4, 8 and 9.

The computer 1200 might also include one or more input/output controllers 1216 for receiving and processing input from a number of input devices, such as a keyboard, a mouse, a touchpad, a touch screen, an electronic stylus, or other type of input device (not shown in FIG. 12). Similarly, an input/output controller 1216 may provide output to a display, such as a computer monitor, a flat-panel display, a digital projector, a printer, a plotter, or other type of output device (also not shown in FIG. 12). It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that various concepts and technologies for deploying and managing tenant services 108 and for routing service requests 510 to tenant services 108 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

Embodiments of the disclosure can be described in view of the following clauses:

Clause 1: A system, comprising:
a host computer having a plurality of tenant services deployed thereto and executing a tenant management service that is configured to
receive a tenant configuration from a fleet management service,
utilize the tenant configuration at a deployment time of the tenant services to identify tenant services that are to be executed on the host computer and tenant services that are not to be executed on the host computer, and
cause at least one of the plurality of tenant services not executing on the host computer to be executed on the host computer in response to receiving a command from the fleet management service; and
at least one computer executing the fleet management service, the fleet management service configured to
provide the tenant configuration to the tenant management service executing on the host computer,
select at least one of the plurality of tenant services not executing on the host computer for execution on the host computer, and
provide the command to the tenant management service to execute the selected at least one of the tenant services on the host computer.

Clause 2: The system of clause 1, wherein the fleet management service is further configured to select one or more tenant services executing on the host computer for termination, and to provide a command to the tenant management service to terminate execution of the selected one or more tenant services, and wherein the tenant management service is further configured to cause execution of one or more tenant service that is executing on the host computer to be terminated in response to receiving the command from the fleet management service.

Clause 3: The system of clauses 1 and 2, wherein the tenant management service is further configured to periodically provide status information to the fleet management service for tenant services executing on the host computer, and wherein the fleet management service is further configured to receive the status information from the tenant management service executing on the host computer, and to select the one or more tenant services for execution or termination based, at least in part, on the status information.

Clause 4: The system of clauses 1-3, wherein the fleet management service is further configured to provide a runtime environment configuration to the tenant services executing on the host computer.

Clause 5: The system of clauses 1-4, wherein the tenant management service is further configured to cause at least two of the plurality of tenant services deployed to the host computer to execute in a process and to cause at least one of the plurality of tenant services deployed to the host computer to execute outside of the process.

Clause 6: A computer-implemented method for managing a plurality of tenant services on a host computer, the method comprising:
determining, at a deployment time of a tenant service on the host computer, whether the tenant service is to be executed on the host computer;
permitting a deployment of the tenant service to the host computer and causing the tenant service to be executed on the host computer in response to determining that the tenant service is to be executed on the host computer; and
permitting the deployment of the tenant service to the host computer but not executing the tenant service at the deployment time of the tenant service in response to determining that the tenant service is not to be executed on the host computer.

Clause 7: The computer-implemented method of clause 6, wherein the deployment time of the tenant service comprises a time at which the tenant is installed on the host computer, updated, or otherwise modified.

Clause 8: The computer-implemented method of clauses 6 and 7, wherein data is received from a fleet management service defining a set of tenant services that are to be executed on the host computer, and wherein the determination as to whether the tenant service is to be executed on the computer is based on the received data.

Clause 9: The computer-implemented method of clauses 6-8, further comprising: receiving a command from the fleet management service to execute a tenant service that is not currently executing on the host computer; and causing the tenant service that is not currently executing on the host computer to be executed on the host computer in response to receiving the command from the fleet management service.

Clause 10: The computer-implemented method of clauses 6-9, further comprising in response to receiving the command from the fleet management service to execute a tenant service that is not currently executing on the host computer: determining that the tenant service that is not currently executing on the host computer has not been deployed to the host computer; and causing the tenant service that is not currently executing on the host computer to be deployed to the host computer in response to determining that the tenant service that is not currently executing on the host computer has not been deployed to the host computer.

Clause 11: The computer-implemented method of clauses 6-10, further comprising: receiving a command from the fleet management service to terminate execution of a tenant service that is executing on the host computer; and causing execution of the tenant service that is executing on the host computer to be terminated in response to receiving the command from the fleet management service.

Clause 12: The computer-implemented method of clauses 6-11, further comprising periodically providing status information to the fleet management service, the status information comprising data describing an operational status of the host computer and one or more tenant services that are executing on the host computer.

Clause 13: The computer-implemented method of clauses 6-12, wherein the tenant services are further configured to configure aspects of their operation utilizing a runtime environment configuration provided by the fleet management service.

Clause 14: A computer-implemented method for managing tenant services on one or more host computers, the method comprising:

providing data to a tenant management service executing on a host computer that defines a set of tenant services that are to be executed on the host computer at a deployment time of the tenant services;

selecting, at a time following the deployment time, one or more tenant services not executing on the host computer for execution on the host computer; and providing a command to the tenant management service executing on the host computer to execute the selected at least one of the tenant services on the host computer.

Clause 15: The computer-implemented method of clause 14, wherein the set of tenant services comprises one or more tenant services.

Clause 16: The computer-implemented method of clauses 14 and 15, further comprising: selecting one or more tenant services executing on the host computer for termination; and providing a command to the tenant management service to terminate execution of the selected one or more tenant services.

Clause 17: The computer-implemented method of clauses 14-16, further comprising: periodically receiving status information from the tenant management service executing on the host computer; and selecting the one or more tenant services for execution or termination based, at least in part, on the received status information.

Clause 18: The computer-implemented method of clauses 14-17, wherein the status information comprises information indicating resource utilization by tenant services executing on the host computer.

Clause 19: The computer-implemented method of clauses 14-18, wherein the status information comprises information indicating resources available at the host computer.

Clause 20: The computer-implemented method of clauses 14-19, further comprising: providing a runtime environment configuration to the tenant services executing on the host computer; and periodically updating the runtime environment configuration based, at least in part, on the received status information.

Clause 21: The computer-implemented method of clauses 14-20, wherein the one or more tenant services are selected for execution on the host computer based, at least in part, upon data indicating that two or more tenant services are to be executed in the same process, on the same host computer, in the same data center or in the same region.

Clause 22: The computer-implemented method of clauses 14-21, wherein the one or more tenant services are selected for execution based, at least in part, upon data indicating that two or more tenant services are to be executed on different host computers in order to provide redundancy.

Clause 23: The computer-implemented method of clauses 14-22, further comprising providing a command to the tenant management service to execute at least two of the tenant services in a process and to execute at least one of the tenant services outside the process.

Clause 24: A system, comprising:

at least one computing device configured to implement one or more services, wherein the one or more services are configured to receive a request from a service client for a network location of an instance of a tenant service for processing a service request generated by the service client, in response to receiving the request, select an instance of the tenant service for processing the service request from a plurality of instances of the tenant service, the selection of the instance of the tenant service made to provide segmentation of the service request generated by the service client from one or more other service requests generated by one or more other service clients, and provide a network location of the selected instance of the tenant service for processing the service request to the service client in response to the request.

Clause 25: The system of clause 24, wherein the request for the network location of an instance of a tenant service for processing the service request comprises metadata for use in selecting an instance of the tenant service for processing the service request from the plurality of instances of the tenant service, and wherein the selection of the instance of the tenant service for processing the service request is made, at least in part, based upon the metadata provided in the request.

Clause 26: The system of clauses 24 and 25, wherein the metadata provided in the request comprises one or more of an identity of the service client, a location of the service client, an identifier for the tenant service, a version of the tenant service, a location of the tenant service, or one or more quality of service requirements or preferences associated with the service client.

Clause 27: The system of clauses 24-26, wherein the selection of the instance of the tenant service for processing the request from the plurality of instances of the tenant service is further made, at least in part, based upon a location of the plurality of instances of the tenant service, resource utilization of one or more host computers executing the plurality of instances of the tenant service, a volume of service requests being processed by the plurality of instances of the tenant service, or a type associated with the plurality of instances of the tenant service.

Clause 28: The system of clauses 24-27, wherein the segmentation of the service request generated by the service client from the one or more other service requests generated by other service clients comprises segmenting service requests between different versions of the tenant service.

Clause 29: The system of clauses 24-28, wherein the instance of the tenant service for processing the service request generated by the service client is selected to implement load balancing among the plurality of instances of the tenant service.

Clause 30: A computer-implemented method for routing a service request to an instance of a tenant service, the method comprising:

receiving a service request from a service client;

in response to receiving the service request, selecting an instance of the tenant service for processing the service request from a plurality of instances of the tenant service;

identifying a network location of the selected instance of the tenant service for processing the service request; and providing the service request to the selected instance of the tenant service at the identified network location.

Clause 31: The computer-implemented method of clause 30, further comprising: receiving a response to the service request from the selected instance of the tenant service; and providing the response to the service client in reply to the service request.

Clause 32: The computer-implemented method of clauses 30 and 31, wherein the selection of the instance of the tenant service for processing the service request is made based, at least in part, upon an identity of the service client, a location of the service client, an identifier for the tenant service, a version of the tenant service, a location of the tenant service, a payload of the service request, or one or more quality of service requirements or preferences associated with the service client.

Clause 33: The computer-implemented method of clauses 30-32, wherein the selection of the instance of the tenant service for processing the service request is made based, at least in part, upon a location of the plurality of instances of the tenant service, current resource utilization of one or more host computers executing the plurality of instances of the tenant service, a volume of service requests currently being processed by the plurality of instances of the tenant service, or a type associated with the plurality of instances of the tenant service.

Clause 34. The computer-implemented method of clauses 30-33, wherein the instance of the tenant service for processing the service request is selected to provide segmentation of the service request provided by the service client from one or more other service requests provided by one or more other service clients.

Clause 35. The computer-implemented method of clauses 30-34, wherein segmentation of the service request provided by the service client from one or more other service requests provided by one or more other service clients comprises selecting an instance of a first version of the tenant service for processing the service request and selecting an instance of a second version of the tenant service for processing the one or more other service requests.

Clause 36: The computer-implemented method of clauses 30-35, wherein the instance of the tenant service for processing the service request is selected to balance service requests between the plurality of instances of the tenant service.

Clause 37: The computer-implemented method of clauses 30-36, further comprising providing the service request to one or more services other than the selected instance of the tenant service.

Clause 38: A computer-implemented method for providing a location of an instance of a tenant service for processing a service request, the method comprising:
receiving a request from a service client for a network location of an instance of a tenant service for processing a service request generated by the service client;
in response to receiving the request, selecting one or more instances of the tenant service for processing the service request from a plurality of instances of the tenant service; and
providing a network location of the one or more selected instances of the tenant service for processing the service request to the service client.

Clause 39: The computer-implemented method of clause 38, wherein the selection of the one or more instances of the tenant service for processing the service request is made, at least in part, based upon one or more attributes of the service client.

Clause 40: The computer-implemented method of clauses 38-39, wherein the attributes of the service client comprise one or more of an identity of the service client, a location of the service client, or one or more quality of service requirements or preferences associated with the service client.

Clause 41: The computer-implemented method of clauses 38-40, wherein the attributes of the service client are specified as metadata in the request received from the service client.

Clause 42: The computer-implemented method of clauses 38-41, wherein the selection of the one or more instances of the tenant service for processing the service request is made, based at least in part, upon one or more attributes associated with the plurality of instances of the tenant service.

Clause 43: The computer-implemented method of clauses 38-42, wherein the one or more attributes associated with the plurality of instances of the tenant service comprise one or more of a location of the plurality of instances of the tenant service, versions of the plurality of instances of the tenant service, current resource utilization of one or more host computers executing the plurality of instances of the tenant service, a volume of service requests currently being processed by the plurality of instances of the tenant service, or a type associated with the plurality of instances of the tenant service.

Clause 44: The computer-implemented method of clauses 38-43, wherein the selection of the one or more instances of the tenant service is made to provide segmentation of the service request generated by the service client from one or more other service requests generated by one or more other service clients.

Clause 45: The computer-implemented method of clauses 38-44, wherein two or more instances of the tenant service are selected for processing the service request, and wherein the service client is configured to provide the service request to the two or more selected instances of the tenant service and to utilize a service response first received from one of the two or more selected instances of the tenant service.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:
1. A system, comprising:
a host computer having a plurality of tenant services deployed thereto at a deployment time, and executing a tenant management service that is configured to:
receive a tenant configuration from a fleet management service that includes data defining processing requirements of the plurality of tenant services;
utilize the tenant configuration to identify first tenant services of the plurality of tenant services that are to be executed on the host computer at the deployment time, and
identify second tenant services of the plurality of tenant services that are not to be executed on the host computer at the deployment time;
cause at least one of the second tenant services not executing on the host computer to be executed on the host computer at a time subsequent to the deployment time, in response to receiving a command from the fleet management service, and in response to, at least in part, the processing requirements;
periodically provide status information to the fleet management service for tenant services executing on the host computer; and
receive a command from the fleet management service to terminate one or more of the tenant services executing on the host computer.

2. The system of claim 1, wherein the fleet management service is further configured to select third tenant services of the plurality of tenant services executing on the host computer for termination, and to provide a command to the tenant management service to terminate execution of the third tenant services, and wherein the tenant management service is further configured to cause execution of the third tenant services that are executing on the host computer to be terminated in response to receiving the command from the fleet management service.

3. The system of claim 1, wherein the fleet management service is further configured to select one or more of the tenant services for execution based at least in part on receiving the status information.

4. The system of claim 1, wherein the fleet management service is further configured to provide a runtime environment configuration to the plurality of tenant services executing on the host computer.

5. The system of claim 1, wherein the tenant management service is further configured to cause at least two of the plurality of tenant services deployed to the host computer to execute in a process and to cause at least one of the plurality of tenant services deployed to the host computer to execute outside of the process.

6. The system of claim 1, further comprising at least one computer executing the fleet management service, the fleet management service configured to provide the tenant configuration to the tenant management service executing on the host computer;
   select, for execution on the host computer at a time subsequent to the deployment time, at least one of the second tenant services that are not to be executed at the deployment time;
   and provide the command to the tenant management service to execute the selected at least one of the second tenant services on the host computer.

7. The system of claim 1, wherein the processing requirements further comprise a condition defining whether the first tenant services can be executed in-process with other tenants.

8. A computer-implemented method for managing a plurality of tenant services deployed on one or more host computers at a deployment time, the method comprising:
   providing data to a tenant management service executing on a host computer that defines (i) a first set of the plurality of tenant services that are to be executed on the host computer at the deployment time; and (ii) processing requirements associated with the first set of the plurality of tenant services;
   selecting a second set of the plurality of tenant services that are not to be executed on the host computer at the deployment time based, at least in part, on the processing requirements;
   providing a command to the tenant management service executing on the host computer to execute, at a time subsequent to the deployment time, the second set of the plurality of tenant services on the host computer;
   periodically receiving status information from the tenant management service executing on the host computer; and
   selecting one or more tenant services for termination based at least in part on the status information.

9. The computer-implemented method of claim 8, further comprising:
   selecting one or more of the plurality of tenant services executing on the host computer for termination; and
   providing a command to the tenant management service to terminate execution of the one or more tenant services.

10. The computer-implemented method of claim 8, further comprising selecting one or more of the plurality of tenant services for execution based, at least in part, on the status information.

11. The computer-implemented method of claim 8, wherein the status information comprises information indicating resource utilization by the plurality of tenant services executing on the host computer.

12. The computer-implemented method of claim 8, wherein the status information comprises information indicating resources available at the host computer.

13. The computer-implemented method of claim 8, further comprising, providing a runtime environment configuration to the plurality of tenant services executing on the host computer and periodically updating the runtime environment configuration based, at least in part, on the status information.

14. The computer-implemented method of claim 8, wherein the second set of the plurality of tenant services is selected based, at least in part, upon data indicating that two or more of the plurality of tenant services are to be executed in a same process, on a same host computer, in a same data center, or in a same region.

15. The computer-implemented method of claim 8, wherein the second set of the plurality of tenant services is selected based, at least in part, upon data indicating that two or more of the plurality of tenant services are to be executed on different host computers in order to provide redundancy.

16. The computer-implemented method of claim 8, further comprising providing a command to the tenant management service to execute at least two of the plurality of tenant services in a process and to execute at least one of the plurality of tenant services outside the process.

17. A system comprising:
   a host computer having a plurality of tenant services deployed thereto at a deployment time, and executing a tenant management service that is configured to:
      provide data to the tenant management service executing on the host computer that defines (i) a first set of the plurality of tenant services that are to be executed on the host computer at the deployment time; and (ii) processing requirements associated with the first set of the plurality of tenant services;
      select a second set of the plurality of tenant services that are not to be executed on the host computer at the deployment time based, at least in part, on the processing requirements;
      provide a command to the tenant management service executing on the host computer to execute, at a time subsequent to the deployment time, the second set of the plurality of tenant services on the host computer;
      periodically receive status information from the tenant management service executing on the host computer; and
      select one or more tenant services for termination based at least in part on the status information.

18. The system of claim 17, wherein the tenant management service is further configured to:
   select one or more of the plurality of tenant services executing on the host computer for termination; and
   provide a command to the tenant management service to terminate execution of the one or more tenant services.

19. The system of claim 17, wherein the tenant management service is further configured to select one or more of the plurality of tenant services for execution based, at least in part, on the status information.

20. The system of claim 17, wherein the status information comprises information that indicates a resource utilization by the plurality of tenant services executing on the host computer.

21. The system of claim 17, wherein the status information comprises information that indicates one or more resources available at the host computer.

22. The system of claim 17, wherein the tenant management service is further configured to provide a runtime environment configuration to the plurality of tenant services executing on the host computer and to periodically update the runtime environment configuration based, at least in part, on the status information.

23. The system of claim 17, wherein the second set of the plurality of tenant services is selected based, at least in part, upon data that indicates that two or more of the plurality of tenant services are to be executed on different host computers in order to provide redundancy.

* * * * *